(12) United States Patent
Schlimgen et al.

(10) Patent No.: US 10,188,023 B2
(45) Date of Patent: Jan. 29, 2019

(54) IMPLEMENT WITH FOLDABLE TOOLBAR SYSTEM

(71) Applicant: Unverferth Manufacturing Co., Inc., Kalida, OH (US)

(72) Inventors: Ronald Joseph Schlimgen, Shell Rock, IA (US); August Paul Nelson, Cedar Falls, IA (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 0 days.

(21) Appl. No.: 15/611,248

(22) Filed: Jun. 1, 2017

(65) Prior Publication Data

US 2017/0354085 A1 Dec. 14, 2017

Related U.S. Application Data

(60) Provisional application No. 62/347,279, filed on Jun. 8, 2016.

(51) Int. Cl.
*A01B 73/02* (2006.01)
*A01B 73/06* (2006.01)
(Continued)

(52) U.S. Cl.
CPC .............. *A01B 73/067* (2013.01); *A01B 5/04* (2013.01); *A01B 63/14* (2013.01); *A01B 73/02* (2013.01);
(Continued)

(58) Field of Classification Search
CPC ...................................................... A01B 73/02
(Continued)

(56) References Cited

U.S. PATENT DOCUMENTS 5,313,772 A * 5/1994 Tonutti ................. A01D 78/144
56/15.9
5,346,019 A 9/1994 Kinzenbaw et al.
(Continued)

OTHER PUBLICATIONS

Thurston Manufacturing Company, BLU-JET, "AT7000, Assembly and Operators Manual," All Terrain Liquid Fertilizer Injection Toolbar, Manual No. 0607090, Oct. 8, 2009, pp. 1-192.
(Continued)

*Primary Examiner* — Gary S Hartmann
(74) *Attorney, Agent, or Firm* — Rothwell, Figg, Ernst & Manbeck, P.C.

(57) ABSTRACT

An agricultural implement includes a frame having a longitudinal axis and laterally opposed sides and motive supports mounted to and supporting the frame. The agricultural implement further includes a first wing carried by the frame and at least one second wing, in which each second wing is pivotably connected to the first wing. The agricultural implement also includes an elevator mechanism configured to raise and lower the first wing and the second wing. Each second wing is connected to the first wing by a wing pivot assembly that includes a skewed hinge pivotably connecting one of the second wings to the first wing. The wing pivot assembly allows each second wing to pivot with respect to the first wing between an operating position and a transport position, in which the skewed hinge defines a first pivot axis oriented at an acute angle with respect to the longitudinal axis.

16 Claims, 19 Drawing Sheets

(51) Int. Cl.
*A01B 5/04* (2006.01)
*A01B 63/14* (2006.01)
*A01B 15/18* (2006.01)
*A01B 49/04* (2006.01)
*A01B 49/06* (2006.01)

(52) U.S. Cl.
CPC ............... *A01B 15/18* (2013.01); *A01B 49/04* (2013.01); *A01B 49/06* (2013.01)

(58) Field of Classification Search
USPC ........................................................ 172/311
See application file for complete search history.

(56) References Cited

U.S. PATENT DOCUMENTS

| | | | | |
|---|---|---|---|---|
| 6,688,093 | B1* | 2/2004 | Franet | A01B 51/026 56/15.3 |
| 7,310,929 | B2* | 12/2007 | Dow | A01B 73/02 172/311 |
| 7,740,084 | B2 | 6/2010 | Rosenboom | |
| 7,827,774 | B2* | 11/2010 | Dow | A01B 73/02 56/192 |
| 8,001,755 | B2* | 8/2011 | Menichetti | A01D 78/144 56/228 |
| 8,342,257 | B2 | 1/2013 | Rosenboom | |
| 8,499,538 | B2* | 8/2013 | Menichetti | A01D 78/144 56/377 |
| 8,528,657 | B1 | 9/2013 | Rosenboom | |
| 8,763,716 | B2 | 7/2014 | Rosenboom | |
| 9,446,091 | B2* | 9/2016 | He | C07K 7/56 |
| 2010/0201186 | A1 | 8/2010 | Rosenboom | |
| 2013/0126196 | A1 | 5/2013 | Rosenboom | |
| 2013/0240223 | A1 | 9/2013 | Rosenboom | |
| 2014/0034341 | A1 | 2/2014 | Fast | |
| 2014/0262563 | A1 | 9/2014 | Rosenboom | |

OTHER PUBLICATIONS

Schaben Industries, AG Spray Equipment, LA9300 Series Liquid Applicator, 2 pages, Date Unknown.
Fast, Side-Fold Liquid Injection Applicators, Model 8200, 2 pages, Date Unknown.
Thurston Manufacturing Company, Press Release "BLU-JET Introduces 90' Liquid Applicator", Sep. 2, 2008, 2 pages.
Brochure for Farm King Liquid Fertilizer Application Equipment, Copyright 2013, 16 pages.

\* cited by examiner

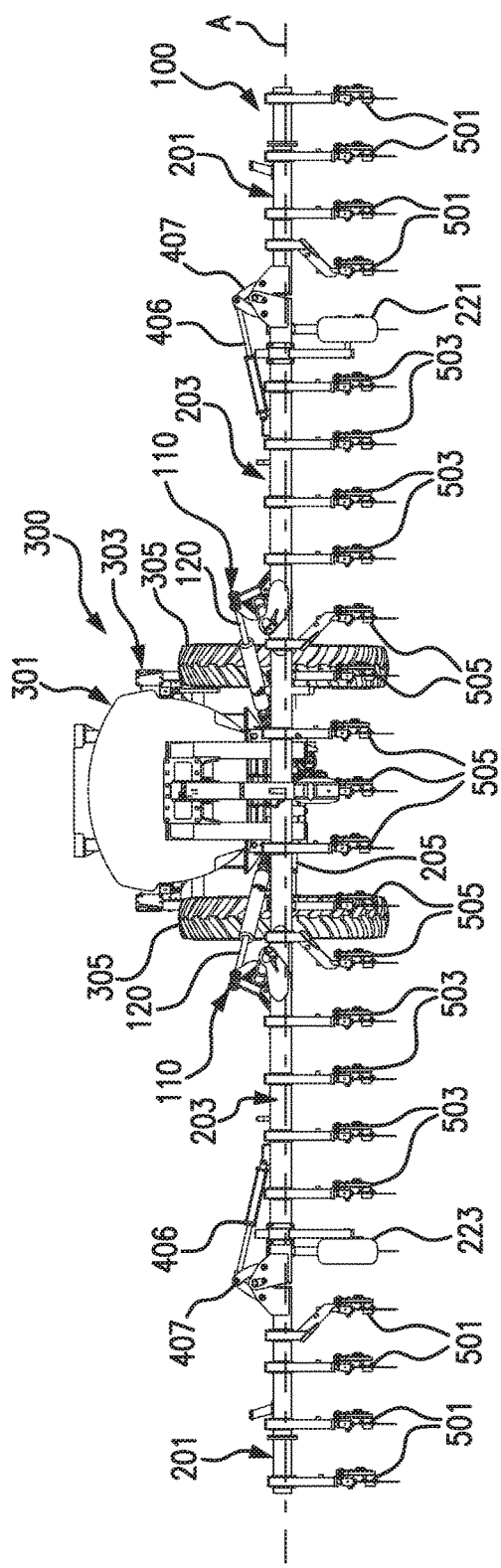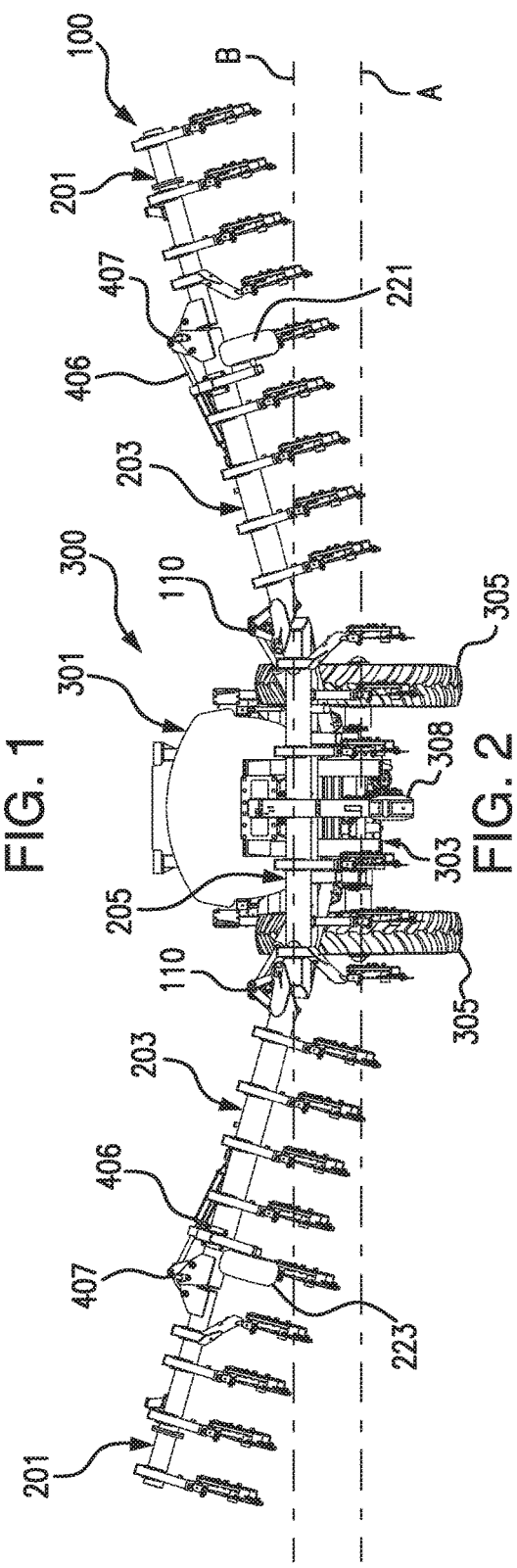

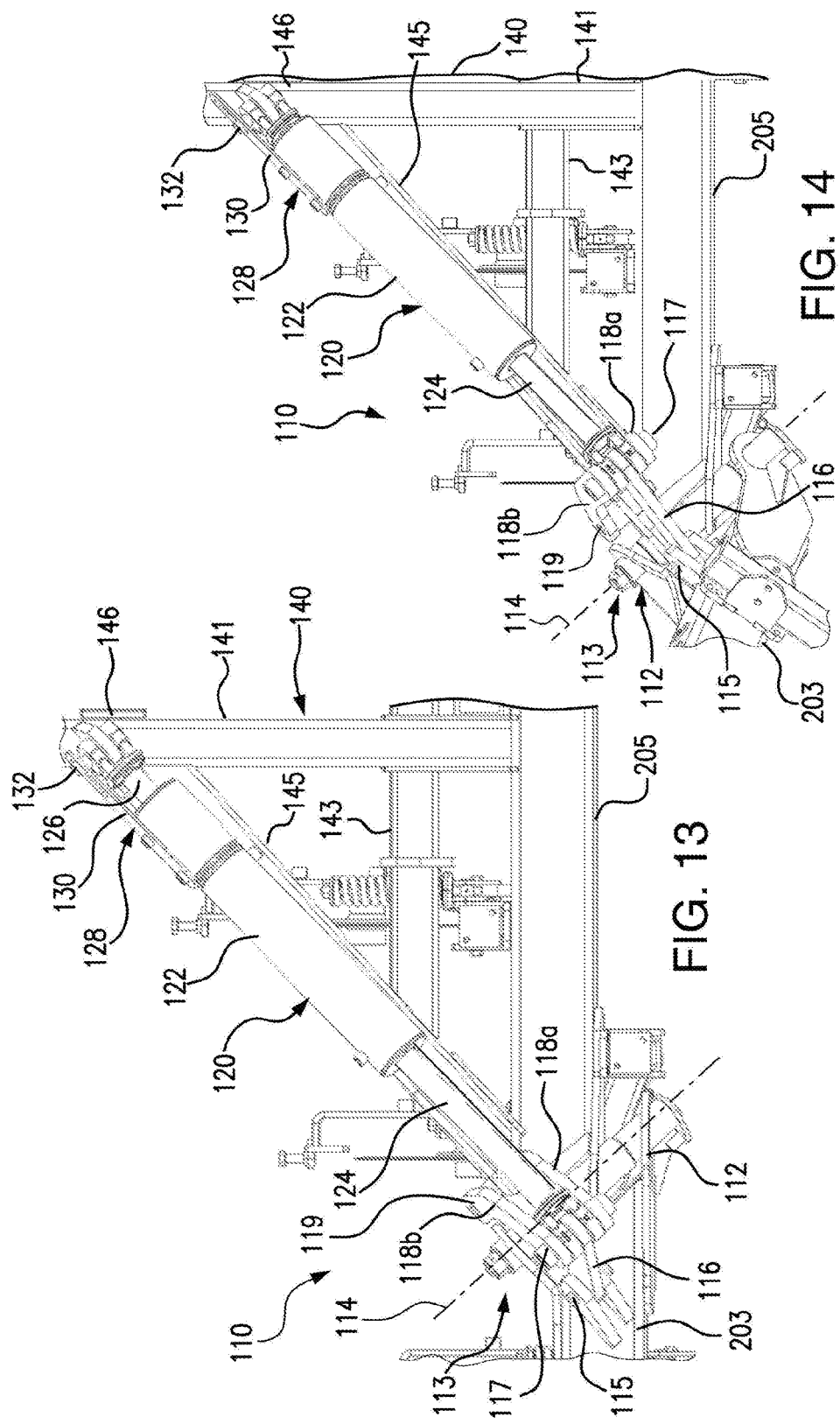

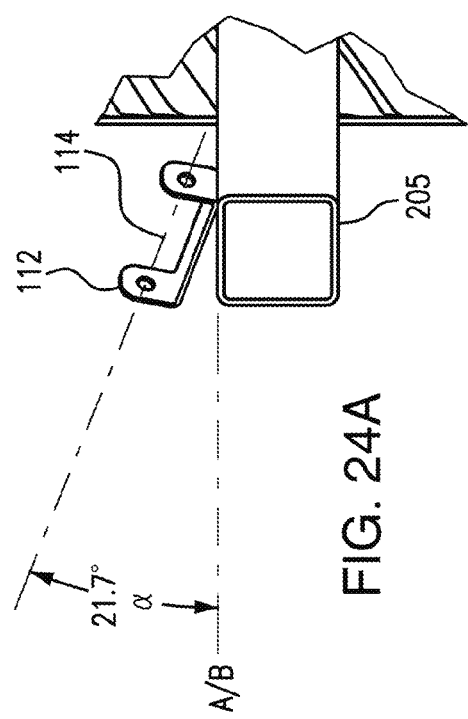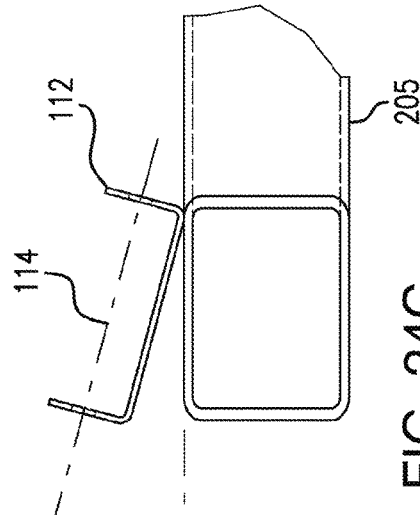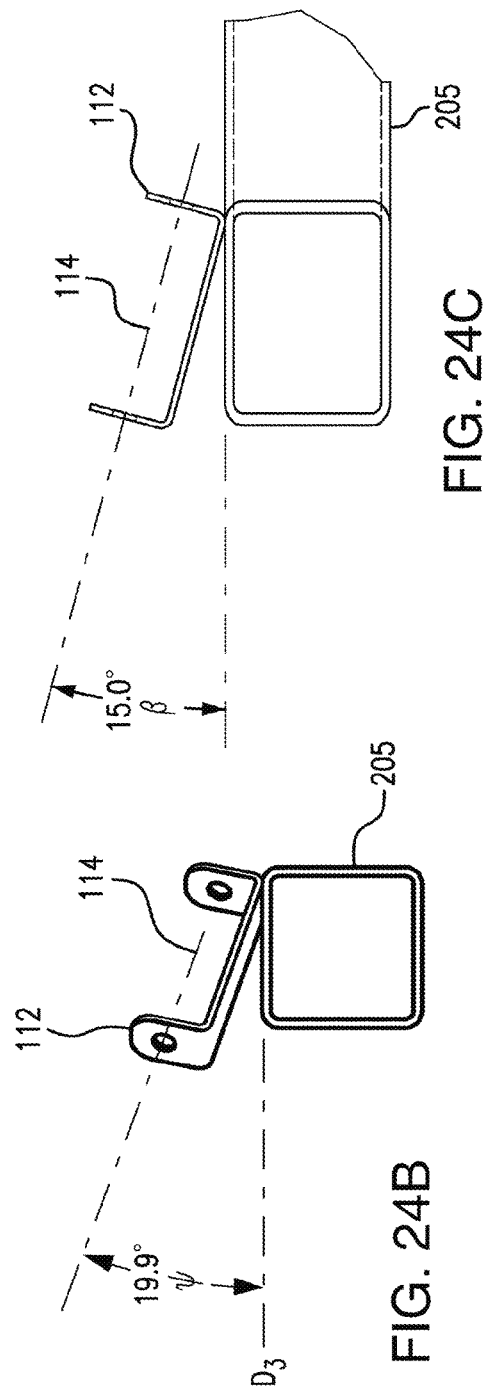

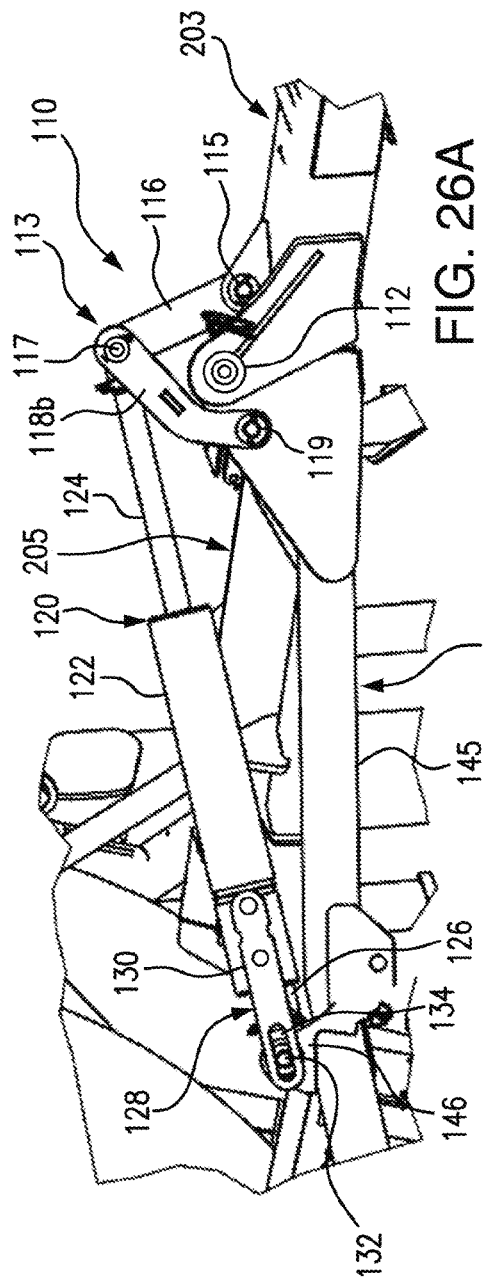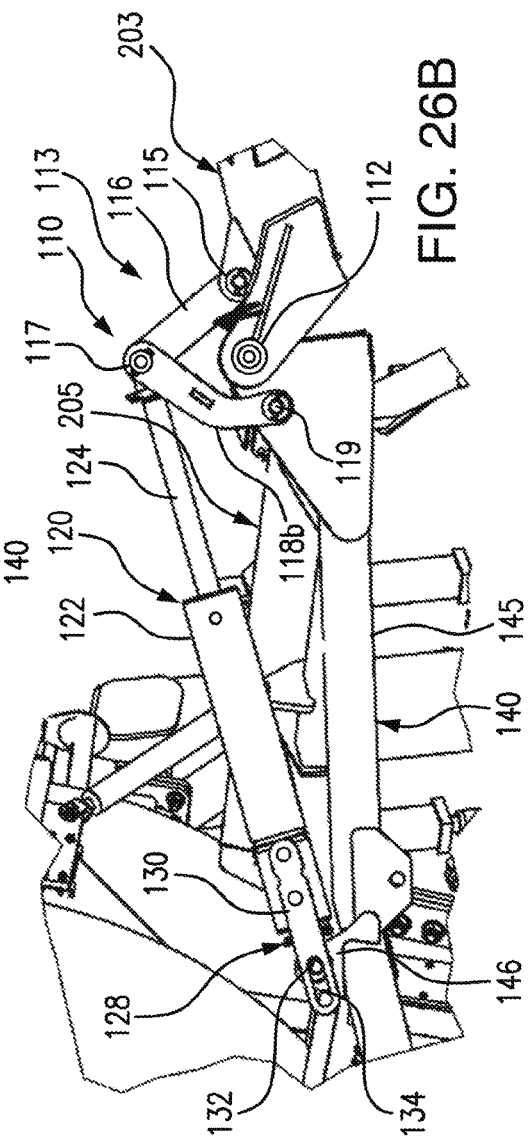

IMPLEMENT WITH FOLDABLE TOOLBAR SYSTEM

CROSS REFERENCE OF RELATED APPLICATION

This application claims the benefit under 35 U.S.C. § 119(e) of the filing date of provisional patent application Ser. No. 62/347,279 filed Jun. 8, 2016, the disclosure of which is incorporated herein by reference in its entirety.

FIELD OF THE DISCLOSURE

This disclosure relates to an agricultural implement with a foldable toolbar system, and, more specifically, to an agricultural implement with a toolbar system having one or more wings adapted to be moveable between an operating position, a transport position, and a shipping position.

BACKGROUND

Agricultural, implements with folding toolbars (also known as "wings") are used to perform various tasks, such as spraying or otherwise applying various types of liquids, including fertilizers, herbicides, pesticides, etc., to agricultural crops as the implement is pulled or pushed across a field. In order to cover a large area during operation, the toolbars are oriented horizontally, perpendicular to the implement's direction of travel (which is often perpendicular to the rows in which the crop plants are arranged) and extend relatively large lengths to either or both sides of the implement. When the implement is not in operation, however, it may be difficult to transport or ship the implement to another location due to its dimension and size. Therefore, some toolbars are adapted to fold upwardly or against a side of the implement to reduce the horizontal extension of the toolbar, but even when folded, the toolbars increase the height or width of the implement, making transport and storage difficult. In addition, some implements require multiple actuators effecting multiple movements to move the toolbars from an operating position to a retracted (transport) position. For example, an implement may require a first actuator to elevate the toolbars, a second actuator to tilt the toolbars up and toward a centerline of the implement, and a third actuator to rotate the tilted toolbar to a transport position.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In accordance with an embodiment of the invention, an agricultural implement is provided that comprises a frame having a longitudinal axis and laterally opposed sides and motive (e.g., rolling) supports, such as wheels or tracks mounted to and supporting the frame. The implement further comprises a first wing carried by the frame and at least one second wing, each second wing being pivotably connected to the first wing. Optionally, the implement may include at least one third wing, each third wing pivotably connected to one second wing. The implement additionally comprises an elevator mechanism configured to raise and lower the first wing, the second wing, and the third wing. A wing pivot assembly comprising a skewed hinge pivotably connecting each second wing to the first wing, wherein the wing pivot assembly is configured to cause each second wing to pivot with respect to the first wing between an operating position extending from the frame in a lateral direction with respect to the longitudinal axis and a transport position alongside one of the opposed sides, and wherein the skewed hinge defines a first pivot axis oriented at an acute angle with respect to the longitudinal axis so that the second wing moves from the operating positon to the transport position in a single pivoting motion.

In embodiments, the agricultural implement further comprises a second wing pivot assembly pivotably connecting each third wing to one second wing and defining a second pivot axis that is transverse to a longitudinal axis of the second wing and configured to cause each third wing to pivot with respect to the second wing. In embodiments, each third wing is configured to pivot with respect to the second wing into a transport or shipping position. In embodiments, the wing pivot assembly includes a linkage assembly and an actuator coupled (e.g. pivotably coupled) to the linkage assembly.

In other embodiments, tools operatively mounted on the first, second, and third wings are provided as well as a pivot bar pivotably coupled at one end to the frame and connected at an opposite end to the first wing. In some embodiments, the tools may comprise coulters. In other embodiments, the agricultural implement further comprises a pivot bar pivotably coupled at one end to the frame and connected at an opposite end to the first wing, wherein the actuator is mounted to the pivot bar. A tank supported on said frame may also be provided.

In some embodiments, the agricultural implement may include a pivot bar pivotably coupled at a first end to the frame and connected at a second end to the first wing. The pivot bar may include an actuator anchor positioned along the pivot bar between the first end and second end. The pivot bar may include a first strut extending between the actuator anchor and the second end connected to the first wing, a second strut extending diagonally between the first strut at the actuator anchor and the first wing adjacent to the skewed hinge, and a third strut extending between the first strut and the second strut. The second strut may be oriented perpendicular to the first pivot axis so that the second strut stabilizes the end of the first wing against forces exerted by the actuator.

In some embodiments, the linkage assembly may include a first linkage and a plurality of second linkages. The first linkage may be pivotably connected at a first end to the second wing adjacent to the skewed hinge, and each second linkage may include a lower end pivotably connected to the first wing adjacent the skewed hinge and an upper end pivotably connected to a second end of the first linkage to define a pivoting connection adjacent to the skewed hinge. The actuator may include a housing and a first rod, in which the first rod extends from a first end of the housing and is connected to the linkage assembly at the pivoting connection. Accordingly, the first rod of the actuator may actuate during the folding operation, thereby causing the second wing to rotate around the skewed hinge from the operating position to the transport position. The actuator may include a second rod extending from a second end of the housing and pivotably connected to a pivot bar, and the pivot bar is pivotably connected at a first end to the frame and connected at a second end to the first wing.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 1 is a front view of the implement with the wings of the toolbar system in a lowered, operating position in accordance with an embodiment of the invention.

FIG. 2 is a front view of the implement with the wings of the toolbar system in a raised, operating position in accordance with an embodiment of the invention.

FIG. 13 is a partial top view of the first wing pivot assembly with the inboard wing in the extended (operating) position with respect to the center wing in accordance with an embodiment of the invention.

FIG. 14 is a partial top view of the first wing pivot assembly with the inboard wing in an intermediate position with respect to the center wing in accordance with an embodiment of the invention.

FIG. 24A is a detailed front view of the skewed hinge.

FIG. 24B is a detailed side view of the skewed hinge.

FIG. 24C is a detailed view of the skewed hinge in a vertical plane parallel to the pivot axis defined by the skewed hinge.

FIG. 26A is a partial view of the first wing pivot assembly in a plane perpendicular to the first pivot axis of the skewed hinge with the inboard wing in the extended (operating) position, parallel to the center wing.

FIG. 26B is a partial view of the first wing pivot assembly in the plane perpendicular to the first pivot axis of the skewed hinge with the inboard wing in the raised operating position with respect to the center wing.

DETAILED DESCRIPTION

Figure 3:
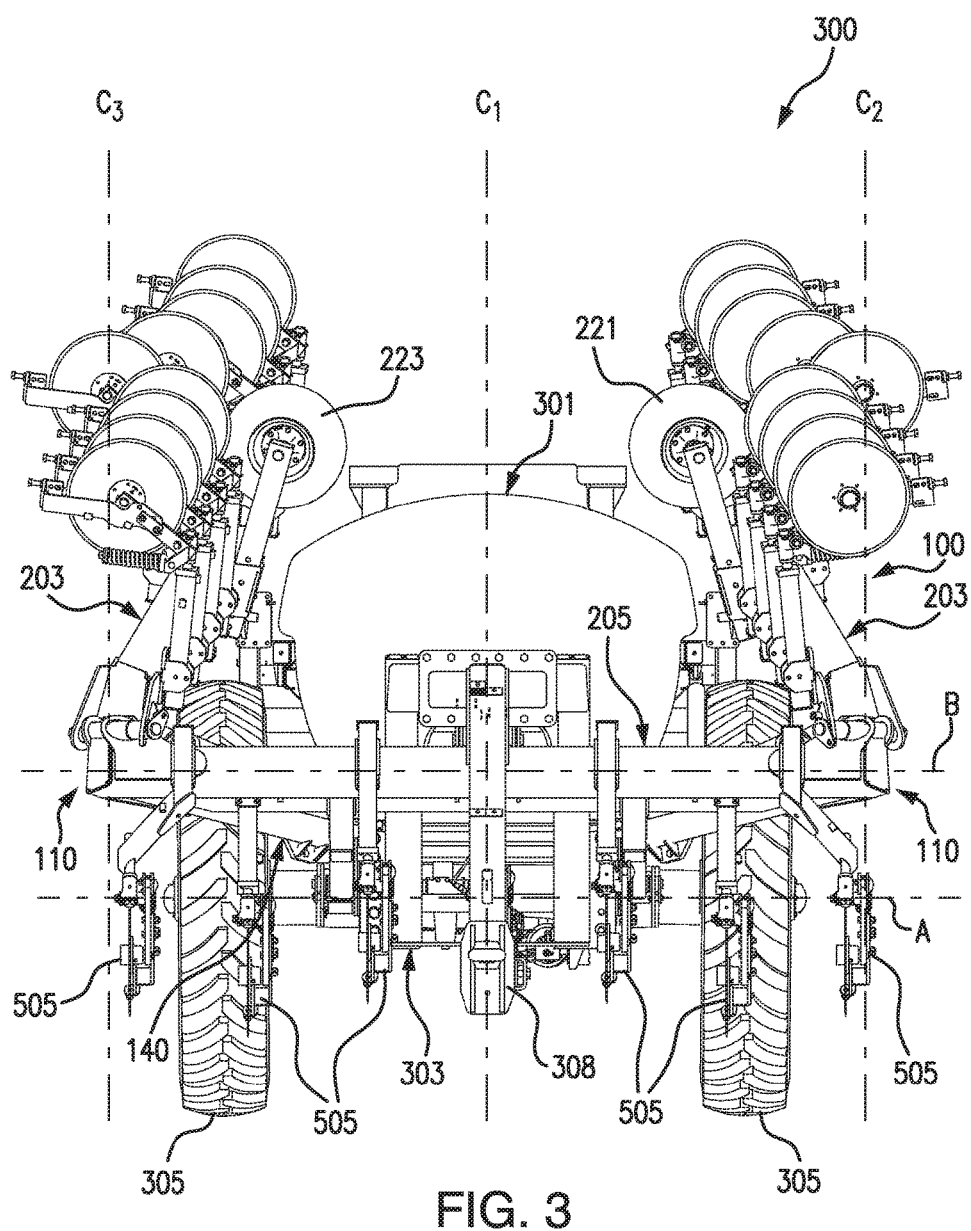
FIG. 3 is a front view of the implement with the wings of the toolbar system in a transport position and showing illustrative dimensions in accordance with an embodiment of the invention.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, or property may or may not be included or occur and that the description includes instances where the component, structure, element, event, circumstance, characteristic, or property is included or occurs and instances in which it is not or does not.

In an embodiment of the present invention, the toolbar system includes a plurality of wings, or booms, that extend from a central vehicle frame and on which one or more tool components is (are) operationally mounted, including at least one first or center wing, at least one second or inboard wing, and at least one third or outboard wing. In an embodiment, the toolbar system may include a first or center wing, and a second or inboard wing pivotably connected to and extending from each of the opposed ends of the center wing, and a third or outboard wing pivotably connected to and extending from an outboard end of each inboard wing. The toolbar system may also include one or more tools, such as coulters and/or fluid nozzles, operationally attached to one or more of the wings and configured to work or condition the soil in some way and/or apply a fluid substance to plants and/or the soil during operation of the implement. While the concepts encompassed herein are exemplified by description of an agricultural sprayer implement having laterally-extending wings and coulters and spray nozzles, operationally mounted on the wings, the present disclosure is not restricted to a sprayer or implement including coulters, and it will be appreciated that any suitable tools may be coupled to the wings of the toolbar system.

FIGS. 1-6 illustrate an agricultural implement 300 with a toolbar system 100. In an embodiment, implement 300 comprises an agricultural sprayer and may include frame 303, a storage tank 301 supported by the frame 303, carriage wheels 305, and a tow bar 308. In various embodiments, the implement may include motive (e.g., rolling) supports other than carriage wheels. For example, the implement may include rolling track assemblies, examples of which are described in U.S. Patent Application Publication No. 2015-0321708, the disclosure of which is hereby incorporated by reference. Tow bar 308 may extend from frame 303 and may include a hitch configured to mate with a coupling hitch on a tow vehicle, such as a tractor, to permit the implement to be towed behind the tow vehicle. Examples of suitable couplings include, e.g., a three-point connection, a draw bar, or any other type of suitable tow coupling known in the industry. In an alternate embodiment, the implement is not a towable vehicle configured to be towed behind a tow vehicle, but is a self-propelled vehicle having three or more wheels, a motor, transmission, and operator control and steering components. The toolbar system 100 may be carried by the frame 303 of the implement 300. In an embodiment, the toolbar system 100 is carried by frame 303 between storage tank 301 and tow bar 308. In other embodiments, the toolbar system is carried by the frame at a position behind the tank relative to the tow bar 308.

In the illustrated embodiment, implement 300 includes two inboard (second) wings 203, one attached to each end of the center (first) wing 205 and extending laterally to each side of the frame 303 and two outboard (third) wings 201, one attached to each outboard end of one of the inboard wings 203. In an alternate embodiment, the implement may include only one inboard wing 203 attached to one end of the center wing 205 and extending laterally to one side of the frame 303 and only one outboard wing 201 attached to an outer end of the inboard wing 203. In an alternate embodiment, the implement may include at least one inboard wing 203 but no outboard wing.

Figure 21:
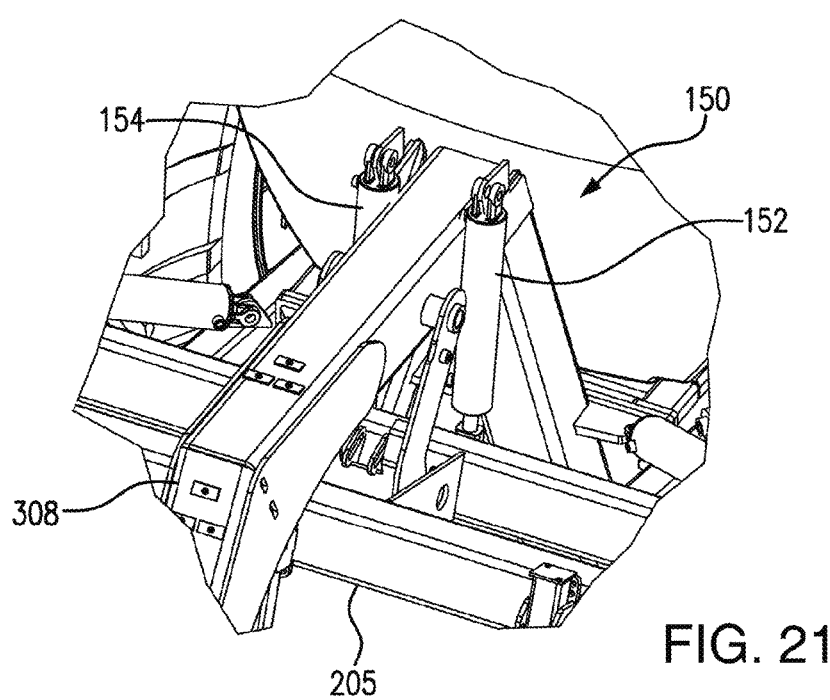
FIG. 21 is a partial perspective view of an elevator mechanism configured to raise or lower the wings of the toolbar system of the implement.

The toolbar system 100 may include an outboard wing 201, an inboard wing 203, a center wing 205, and an elevator mechanism 150 (see FIG. 21). In an embodiment, wings 201, 203, and 205 may include a series of fluid nozzles spaced longitudinally along the wings for spraying liquids from storage tank 301. The toolbar system 100 may include gauge wheels 221 and 223 coupled to the wings and configured to partially support the weight of the inboard and outboard wings 203, 201 when in the extended position as shown in FIG. 1. It is appreciated that the toolbar system 100 can be used with or without the gauge wheels. Each of the wings may further include a set of tools, such as coulters, e.g., the outboard wing 201 may include outboard wing coulters 501, the inboard wing 203 may include inboard wing coulters 503, and the center wing 205 may include center wing coulters 505. In an embodiment, tools or equipment other than coulters may be mounted to the wings, such as knives, spikes, tines, or ripper points. It will also be appreciated that no tools may be mounted to some of the wings, e.g., the center wing may have no tools mounted on it.

The wings 201, 203, 205 in FIG. 1 are shown in a lowered operating position in which inboard wings 203 extend laterally outward from opposite ends of the center wing 205, and the outboard wings 201 extend laterally outward from outer ends of inboard wings 203. The toolbar system 100 is at its lowest position so that the tools (e.g., coulters 501, 503, 505) are engaged with the ground, and the gauge wheels 221 and 223 are in contact with the ground. In an embodiment, respective longitudinal axes of inboard and outboard wings 203 and 201 are aligned and collinear along a first lateral axis A.

Each inboard wing 203 may be mounted to a respective end of the center wing 205 so as to be pivotable with respect thereto. In one embodiment, each inboard wing 203 is mounted to the respective end of the center wing 205 by a first wing pivot assembly 110 including a hinge or linkage 113 defining a first pivot axis 114 configured to permit the inboard wing 203 to pivot with respect to the center wing 205 and including an actuator 120 configured to cause the inboard wing 203 to pivot with respect to the center wing 205. The first pivot axis 114 is generally horizontal in orientation and is skewed at an acute angle with respect to longitudinal axis $D_1$ as will be described below.

Each outboard wing 201 may be mounted to the end of a respective inboard wing 203 so as to be pivotable with respect thereto. In one embodiment, each outboard wing 201 is mounted to the respective inboard wing 203 by a second wing pivot assembly comprising a hinge or linkage 407 configured to permit the outboard wing 201 to pivot with respect to the respective inboard wing 203 and defining a second pivot axis (reference number 407 may be used to refer to the second pivot axis or the hinge or linkage defining the second pivot axis). The second pivot axis 407 is generally horizontal in orientation and parallel to a longitudinal axis $D_1$ of the implement 300 (see FIG. 4) when the second and third wings 203, 201 are in the operating position. Stated another way, the second pivot axis is generally transverse (e.g., perpendicular) to the longitudinal axes of the second and third wings 203, 201.

An actuator 406, such as a linear actuator such as a hydraulic piston, is provided to effect powered rotation of each outboard wing 201 with respect to its associated inboard wing 203. In the illustrated embodiment, one end of the actuator 406 is attached to the inboard wing 203 and the opposite end of the actuator 406 is coupled (e.g. pivotably coupled) to the linkage 407 defining the second pivot axis. Actuator 406 is extended to position the outboard wing 201 in the extended position as shown in FIGS. 1 and 2. The actuator 406 is retracted to pivot each outboard wing 201 with respect to its associated inboard wing 203. That is, in the embodiments as shown in FIGS. 1 and 2, the outboard wing 201 on the right-hand side of the drawing is caused to pivot counterclockwise with respect to the associated inboard wing 203, and the outboard wing 201 on the left-hand side of the drawing is caused to pivot clockwise with respect to the associated inboard wing 203. As a result, the implement 300 may operate between two applicant widths, a first application width and a second application width, when working or conditioning the soil. In the first application width, both the inboard and the outboard wings 203, 201 are extending laterally outward from the outer ends of the center wing 201 so that the respective longitudinal axes of the inboard and outboard wings 203, 201 are aligned and collinear along the first lateral axis A, as shown in FIG. 1. The implement 300, however, may effect rotation of each outboard wing 201 with respect to its associate inboard wing 203 via the actuator 406 and the second pivot assembly 407 so that each outboard wing 201 is partially pivoted upward while the inboard wings 203 and center wing 205 remain aligned in the operating position. Accordingly, the implement 300 is set to the second application width, in which the implement 300 may operate at a limited wingspan.

The wings 201, 203, 205 in FIG. 2 are shown in a raised operating position in which the wings 201, 203, 205 are raised by an elevator mechanism, e.g., elevator mechanism 150 shown in FIG. 21, so as to raise the wings 201, 203, 205 and gauge wheels 221, 223 out of contact with the ground to a position corresponding to a second lateral axis B that is elevated above and generally parallel to first lateral axis A. In addition, the inboard wing 203 and outboard wing 201 on each side of the center wing 205 are partially pivoted upwardly as a unit about the first pivot axis 114 on each side of the center wing 205. The wings 201, 203, and 205 may be placed in the raised operating position while the implement 300 is in use and is being re-positioned, for example when the implement reaches the end of the crop rows, the wings 201, 203, 205 may be moved to the raised operating position shown in FIG. 2 so that the implement 300 can be turned around to go back down the adjacent rows in the opposite direction.

In various embodiments, when the inboard wing 203 is in the lowered operating position as shown in FIG. 1, it may be configured to tilt downwardly with respect to horizontal, e.g., by an angle of about 8°, accommodate ground contours, as is conventional with such tool systems.

An exemplary elevator mechanism 150 is shown in FIG. 21. The mechanism 150 may include two actuators 152, 154, which may comprise hydraulic pistons, mounted at one end thereof to an upper portion of the tow bar 308 and mounted at a lower end, directly or indirectly, to the center wing 205. Extending the piston rods of the actuators 152, 154 lowers the center wing 205, and retracting the piston rods raises the center wing 205 and the inboard wings 203 and outboard wings 201 attached thereto. In other embodiments (not shown), the one end of the actuators 152, 154 may be mounted to support members of the tank 301 or the frame 303.

Figure 4:
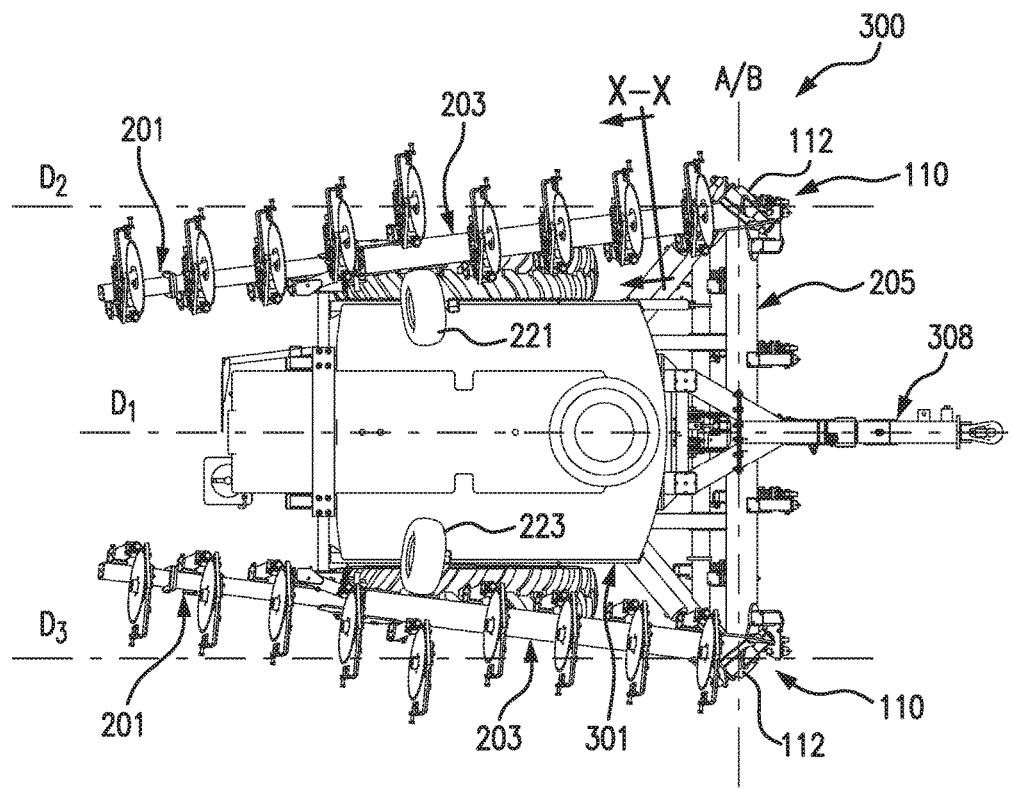
FIG. 4 is a top view of the implement with the wings of the toolbar system in the transport position and showing illustrative dimensions in accordance with an embodiment of the invention.
Figure 5:
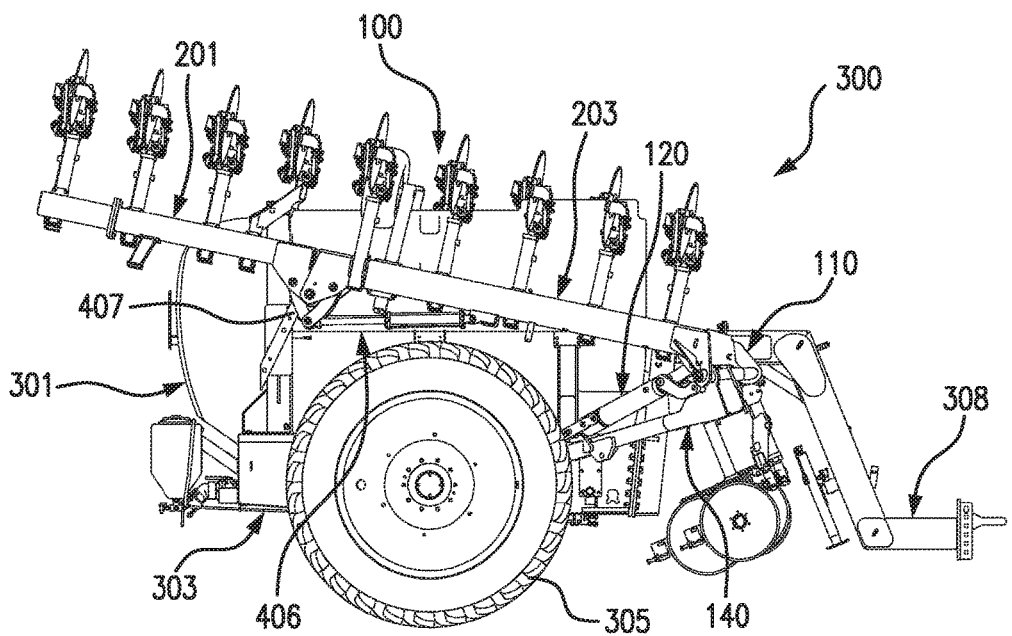
FIG. 5 is a side view of the implement with the wings of the toolbar system in the transport position and showing illustrative dimensions in accordance with an embodiment of the invention.

The toolbar system 100 is configured to move the inboard wings 203 and outboard wings 201 to a transport position as shown in FIGS. 3, 4, 5 whereby the inboard wings 203 and the outboard wings 201 are oriented in positions alongside the frame 303 and tank 301 and angled upwardly so as to extend above the wheels 305. As shown in FIG. 4, the inboard wings 203 and outboard wings 201 may be rotated to positions having general longitudinal orientations and may be rotated beyond a true longitudinal orientation to a position inward of longitudinal axes $D_2$ and $D_3$, which are parallel to the center longitudinal axis $D_1$ and extend through the first pivot assemblies 110. As shown in FIG. 3, the inboard wings 203 and outboard wings 201 are also rotated to positions beyond vertical axes $C_2$ and $C_3$, which are parallel to a center vertical axis $C_1$ (the vertical centerline) of the implement 300 and which extend through the first pivot assemblies 110.

By rotating the wings 201, 203 as far inwardly toward the tank 301 (i.e., beyond merely parallel to center longitudinal axis D1 and center vertical axis C2) the implement 300 presents the smallest possible width in the transport configuration.

In one embodiment, the inboard wing 203 rotates about 161°±5.0 with respect to the center wing 205 from the lower operating position (FIG. 1) to the transport position (FIG. 5).

Figure 6:
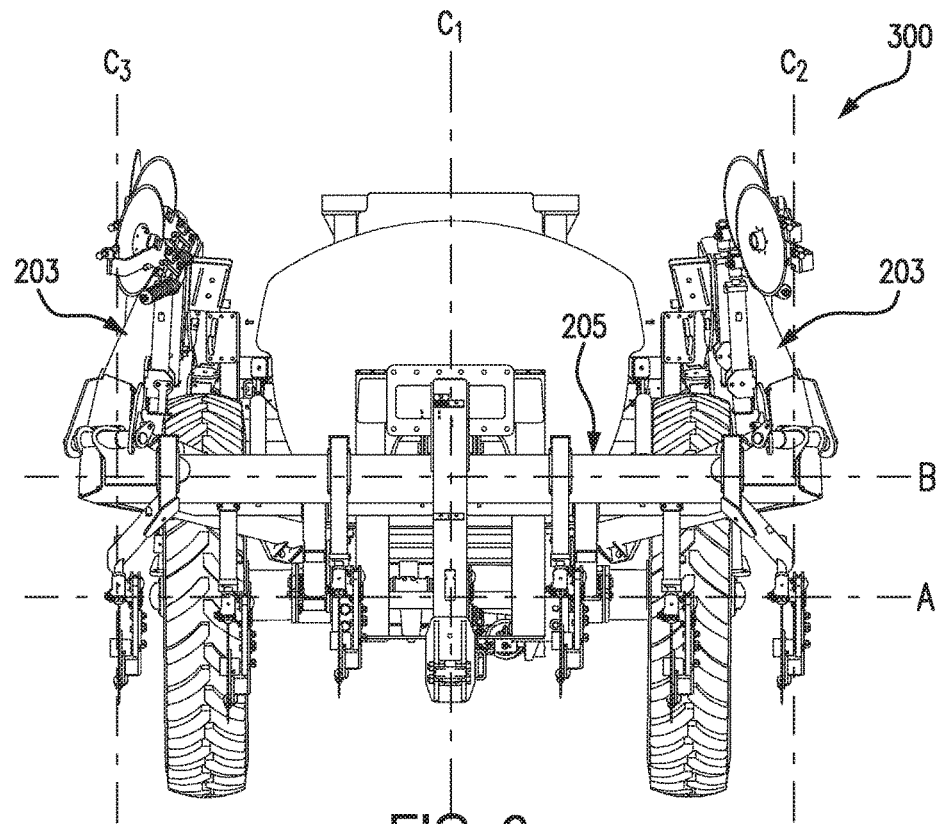
FIG. 6 is a front view of the implement with the wings of the toolbar system in a shipping configuration and showing illustrative dimensions in accordance with an embodiment of the invention.
Figure 7:
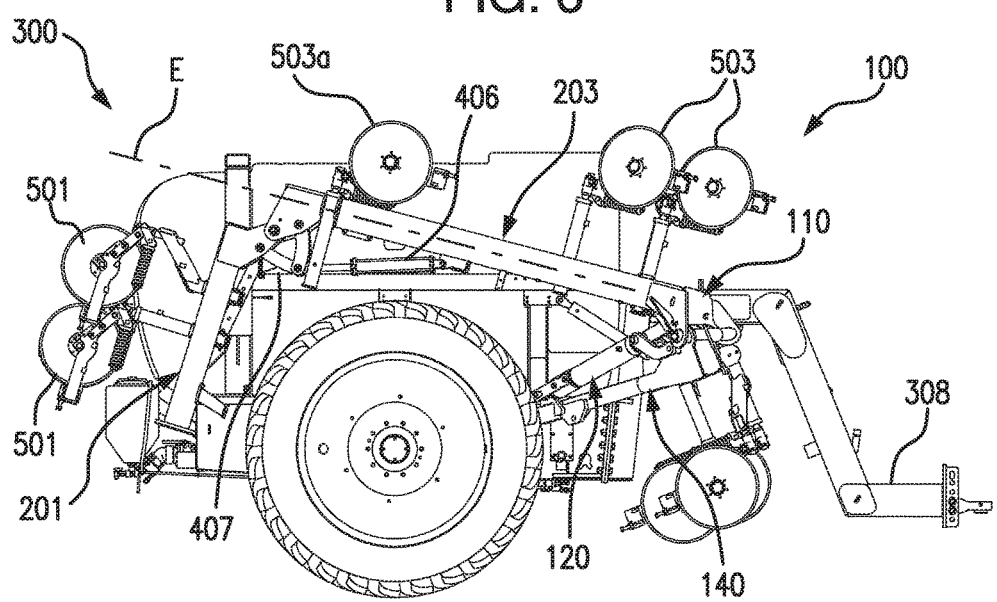
FIG. 7 is a side view of the implement with the wings of the toolbar system in the shipping configuration and showing illustrative dimensions in accordance with an embodiment of the invention.

As shown in FIGS. 6 and 7, the implement 300 is further adapted to be reconfigured into a shipping configuration. In the shipping configuration, the outboard wings 201 are pivoted downwardly with respect to an axis E aligned with the inboard wings 203 positioned in the transport configuration. The pivoting of the outboard wings 201 is effected by actuator 406.

In addition to pivoting the outboard wing 201 downwardly with respect to the inboard wing 203, a number of inboard coulters 503 and outboard coulters 501 can be removed from the inboard wing 203 and outboard wing 201, respectively. In addition, the remaining coulters 501 and 503 on the outboard wing 201 and inboard wing 203, respectively, can be turned sideways (e.g., about 90° from their operating positions) as shown in FIG. 7. Finally, one or more coulters, such as the outboard coulter closest to the second pivot axis defined by linkage 407 (labeled 503a in FIG.7), can be lowered with respect to the inboard wing 203 to limit the height to which the coulters 503a extends upwardly.

These adjustments to the outboard wing 201 and to the coulters reduces the overall height, width, and length of the implement 300, thereby providing for a more compact shipping configuration. By way of illustration, and without intending to be limiting, as shown in FIGS. 3 and 4, an exemplary overall width of the implement 300 when it is in the transport position may be about 158 27/32 inches. As shown in FIG. 6, the overall width of the implement 300 in the shipping configuration may be about 139 29/32 inches, a reduction of nearly 19 inches. As shown in FIGS. 3 and 5, an exemplary height of the implement 300 when in the transport configuration may be about 147 9/16 inches. As shown in FIG. 6, the height of the implement 300 when in the shipping configuration may be about 116 31/32 inches, a reduction of over 30 inches. As shown in FIG. 5, in an embodiment, an exemplary overall length of the implement 300 in the transport position may be 244 3/16 inches. As shown in FIG. 7, in the shipping configuration, the overall length may be about 231 1/4 inches, a reduction of nearly 13 inches.

Figure 22:
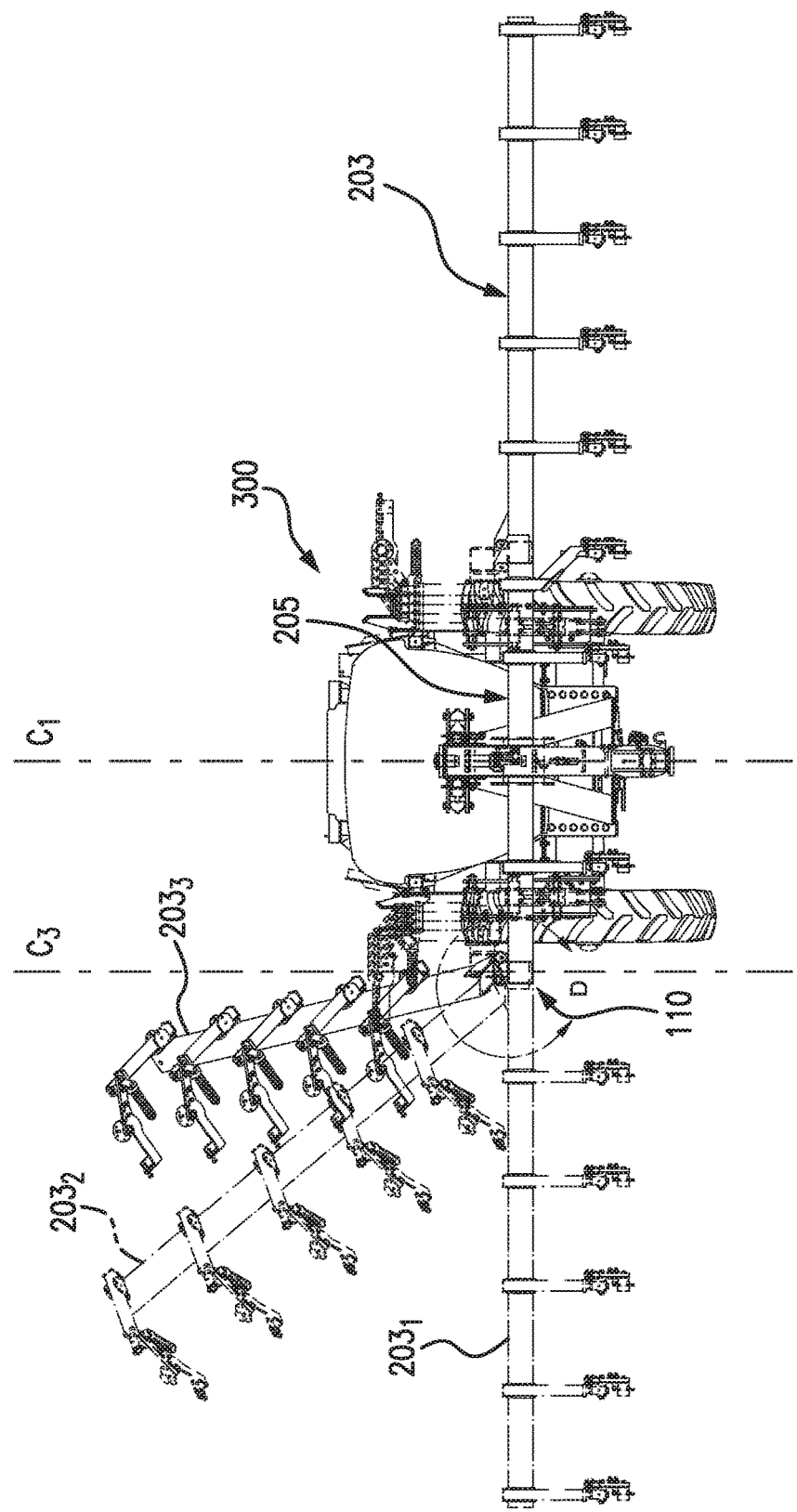
FIG. 22 is a front view of the implement showing the inboard wing on one side of the implement being moved from an extended position to intermediate retracted positions in accordance with an embodiment of the invention.

FIG. 22 is a front view of the implement 300 showing the inboard wing 203 on one side of the implement 300 being moved from an extended position $203_1$ to intermediate retracted positions $203_2$ and $203_3$ approaching the vertical axis C3 extending through the first wing pivot assembly 110. For simplicity, the outboard wings 201 are not shown in FIG. 22.

Figure 22D:
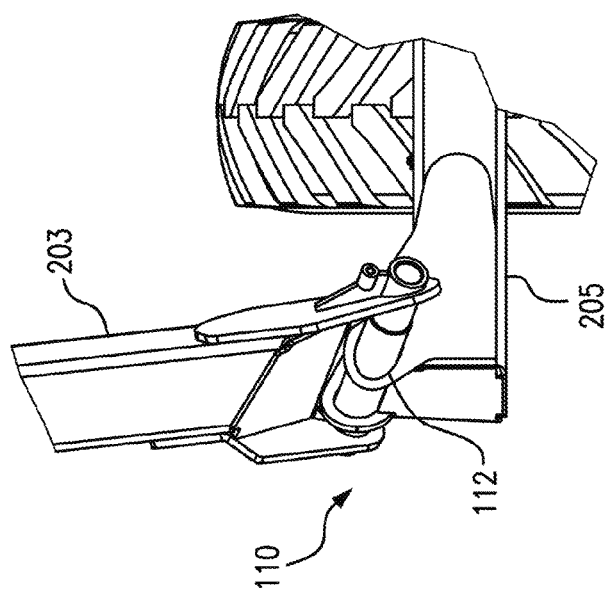
FIG. 22D shows a detail of the first wing pivot assembly illustrating a skewed hinge pivotably connecting the center wing and the inboard wing in accordance with an embodiment of the invention.

FIG. 22D shows a detail of the first wing pivot assembly 110 illustrating a skewed hinge 112 pivotably connecting the center wing 205 and the inboard wing 203.

Figure 23E:
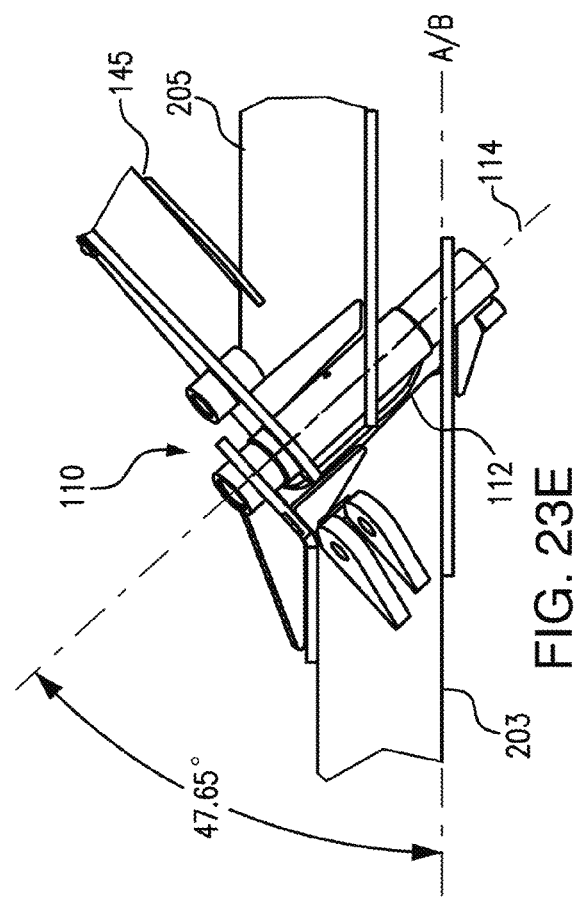
FIG. 23E shows a detail of the first wing pivot assembly with the skewed hinge connecting the inboard wing and the center wing and defining a first pivot axis in accordance with an embodiment of the invention.
Figure 23:
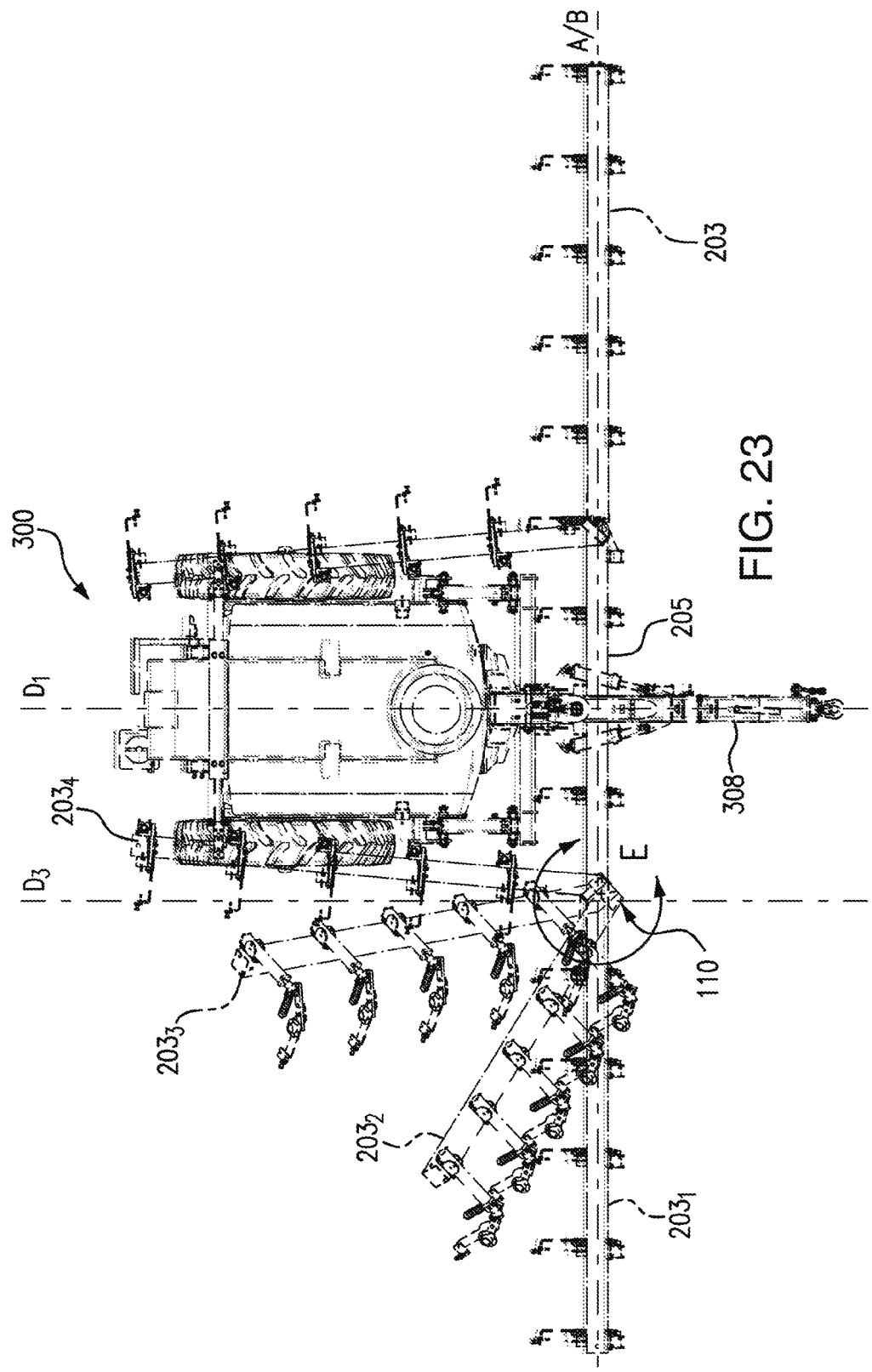
FIG. 23 is a top view of the implement showing the inboard wing on one side of the implement moving through positions from the extended position through intermediate retracted positions to the final retracted position in accordance with an embodiment of the invention.

FIG. 23 is a top view of the implement 300 showing the inboard wing 203 on one side of the implement moving through positions from the extended position $203_1$ through intermediate retracted positions $203_2$, $203_3$ to the final retracted position $203_4$ rotated beyond the longitudinal axis $D_3$ extending through the first wing pivot assembly 110.

FIG. 23E shows a detail of the first wing pivot assembly 110 with the skewed hinge 112 connecting the center wing 205 and the inboard wing 203 and defining a first pivot axis 114. As shown, the first pivot axis 114 is oriented at an angle (e.g., about 47.65°±15.0°) with respect to the lateral axes A/B (i.e., about 42.35°±15.0° with respect to longitudinal axis $D_2$ or $D_3$). Further details of the angles of an illustrative embodiment of the first pivot axis 114 defined by skewed hinge 112 are shown in FIGS. 24A-C. FIG. 24A is a detailed front view of the skewed hinge 112 in a plane parallel to the lateral axis A/B. As shown, first pivot axis 114 forms an angle $\alpha$ (e.g., about 21.7°)±7.0° up with respect to horizontal (i.e., axes A/B). FIG. 24B is a detailed side view of the skewed hinge 112 in a plane parallel to longitudinal axis $D_3$. As shown, first pivot axis 114 forms an angle $\psi$ (e.g., about 19.9°)[±6.0°] up with respect to horizontal (i.e., axis $D_3$). FIG. 24C is a detailed view of the skewed hinge 112 in a plane parallel to the first pivot axis 114 defined by the skewed hinge 112. As shown, first pivot axis 114 forms an angle $\beta$ (e.g., about 15.0°±5.0°) up with respect to a top surface of the center wing 205. Due to the angle of the first pivot axis 114 defined by the skewed hinge 112, the wing pivot assembly 110 is configured to permit the inboard wing 203 to pivot with respect to the center wing 205 by an angle of up to about 181°.

Figure 25:
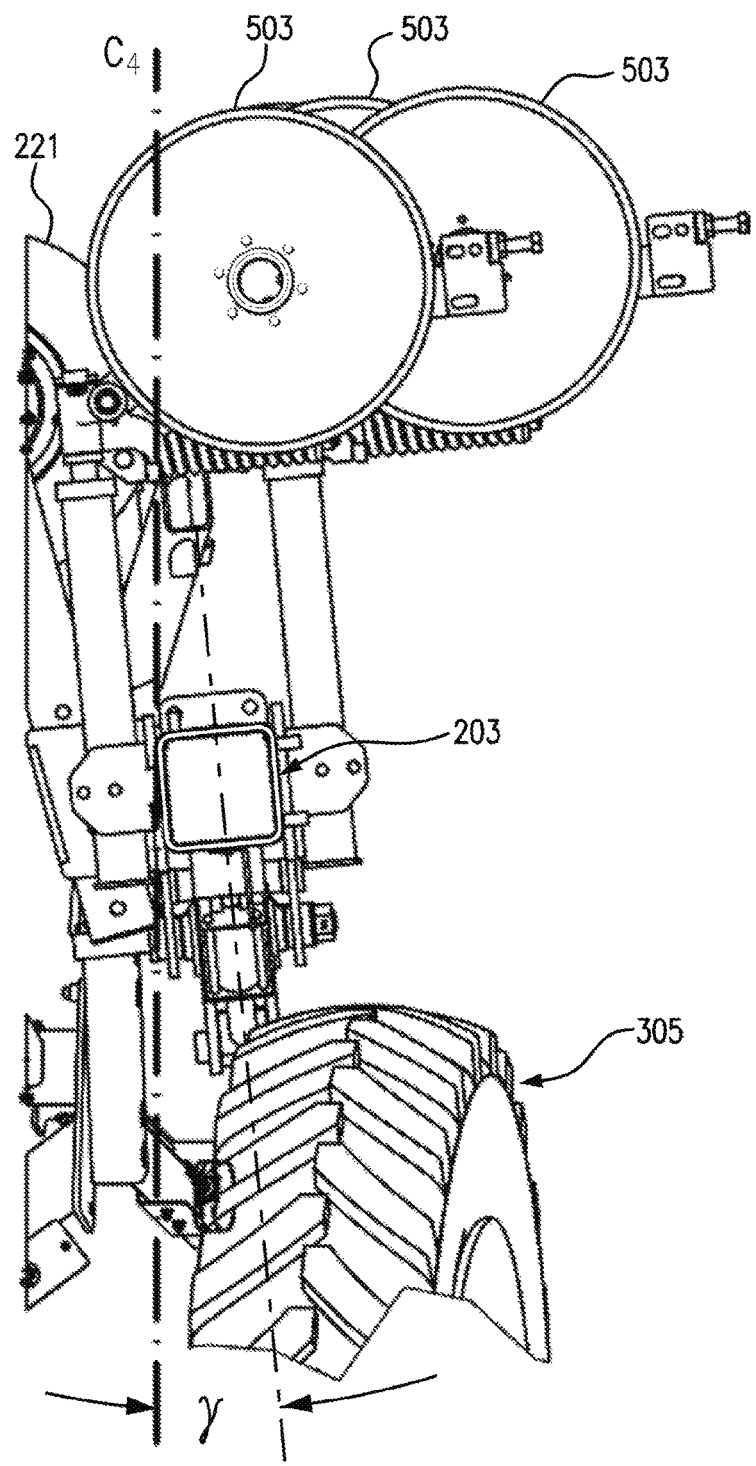
FIG. 25 is a transverse cross-section of an inboard wing of the toolbar system along the line X-X in FIG. 4.

The different angles of the skewed hinge shown in FIGS. 23E and 24A-C effect the position of inboard wing 203 in the transport and shipping positions. The angle of the first pivot axis 114 with respect to lateral axis A/B (e.g., about 47.65°±15.0°, see FIG. 23E) causes the inboard wing 203 to pivot into a position along the side of the implement 300 (e.g., alongside tank 301 as shown in FIGS. 3 and 4). The angle $\beta$ of the first pivot axis 114 (e.g., about 15.0°±5.0°, see FIG. 24C) causes the inboard wing 203 to twist, or rotate about its longitudinal axis (see axis E in FIG. 7) so it and its associated tools 503 have a final position such that the tools 503 (as well as tools 501 of outboard wing 201) are positioned closer toward the centerlines $C_1$ and $D_1$ as shown in FIGS. 3 and 4. FIG. 25 is a transverse cross-section of an inboard wing 203 of the toolbar system along the line X-X in FIG. 4 that shows the inboard wing 203 twisted by an angle $\gamma$ (e.g., about 5.5°) with respect to vertical axis $C_4$, which is parallel to axes $C_1$, $C_2$, and $C_3$. With the coulters 501, 503 being offset from the wings 201, 203, this inward position of the coulters 501, 503 due to the inward "lean" of the wings 201, 203 contributes to a narrow transport configuration as can be seen in FIG. 4 with reference to the vertical axes $C_2$ and $C_3$.

Figure 18:
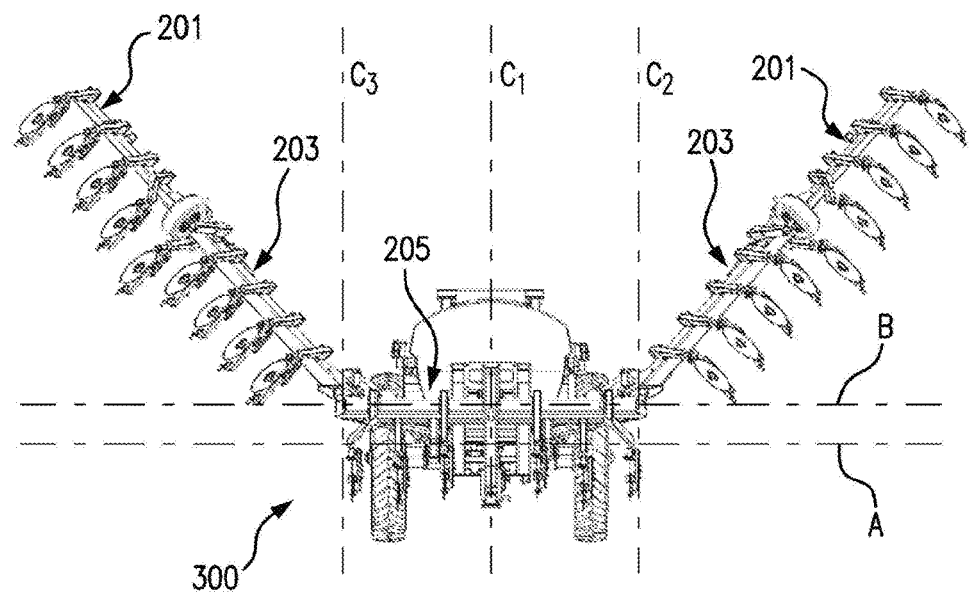
FIG. 18 is a front view of the implement showing the center wing, inboard wings, and outboard wings in the elevated position and showing the inboard wings and outboard wings partially retracted toward the transport positions in accordance with an embodiment of the invention.

FIG. 18 is a front view of the implement 300 showing the center wing 205, inboard wings 203, and outboard wings 201 in the elevated position and showing the inboard wings 203 and outboard wings 201 partially retracted toward the transport positions.

Figure 19:
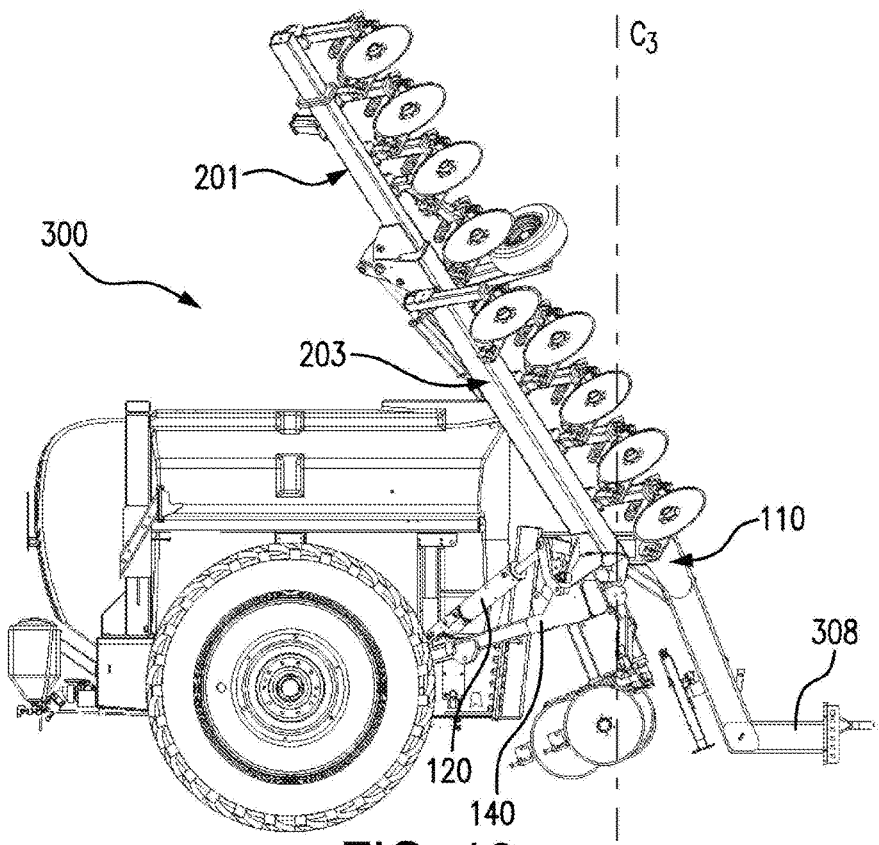
FIG. 19 is a side view of the implement showing the inboard and outboard wings partially retracted towards the transport positions in accordance with an embodiment of the invention.
Figure 20:
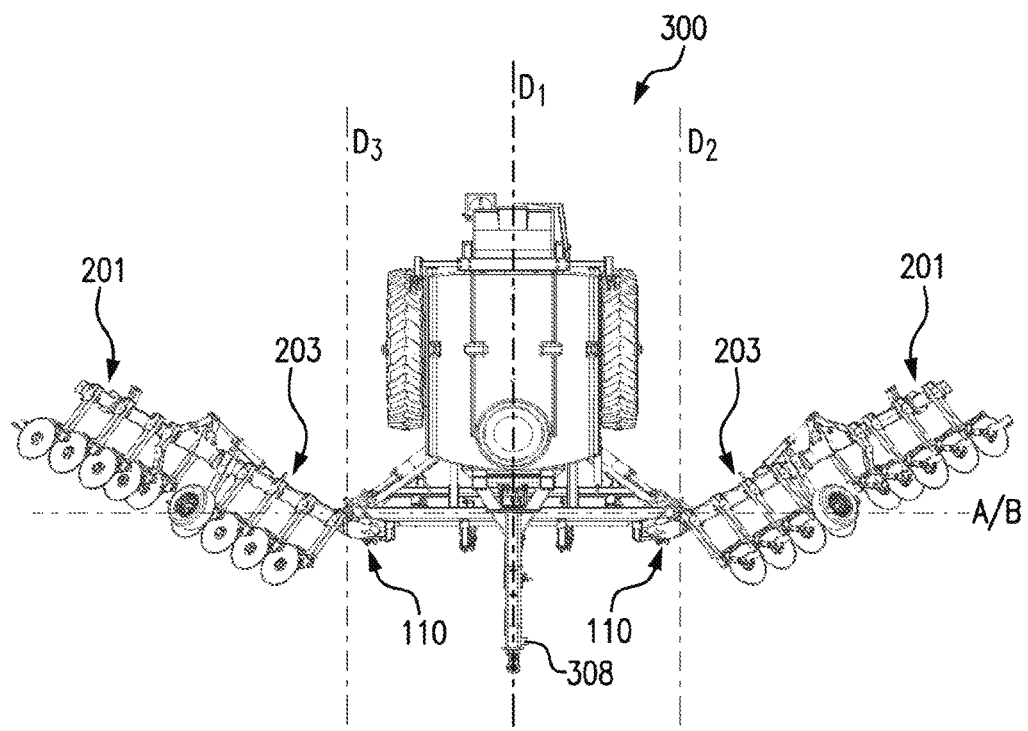
FIG. 20 is a top view of the implement with the inboard wings and outboard wings partially retracted into the transport positions in accordance with an embodiment of the invention.

FIG. 19 is a side view of the implement 300 showing the wings 203, 201 partially retracted towards the transport positions. As shown in FIG. 19, as the wings are retracted, they are oriented at an angle relative to a vertical axis $C_3$ extending through the first wing pivot assembly 110. FIG. 20 is a top view of the implement 300 with the inboard wings 203 and outboard wings 201 partially retracted into the transport positions. As can be seen in the FIG. 20, as the wings 201, 203 are retracted, they are angled rearwardly with respect to the lateral axes A, B. That is, as shown in FIGS. 19 and 20, due to the angle of the skewed hinge, 112 (see FIGS. 22D, 23E), the wings 201, 203 pivot up and back as they are raised.

Details of the first wing pivot assembly are shown in FIGS. 8-17 and 26A-26C.

Figure 8:
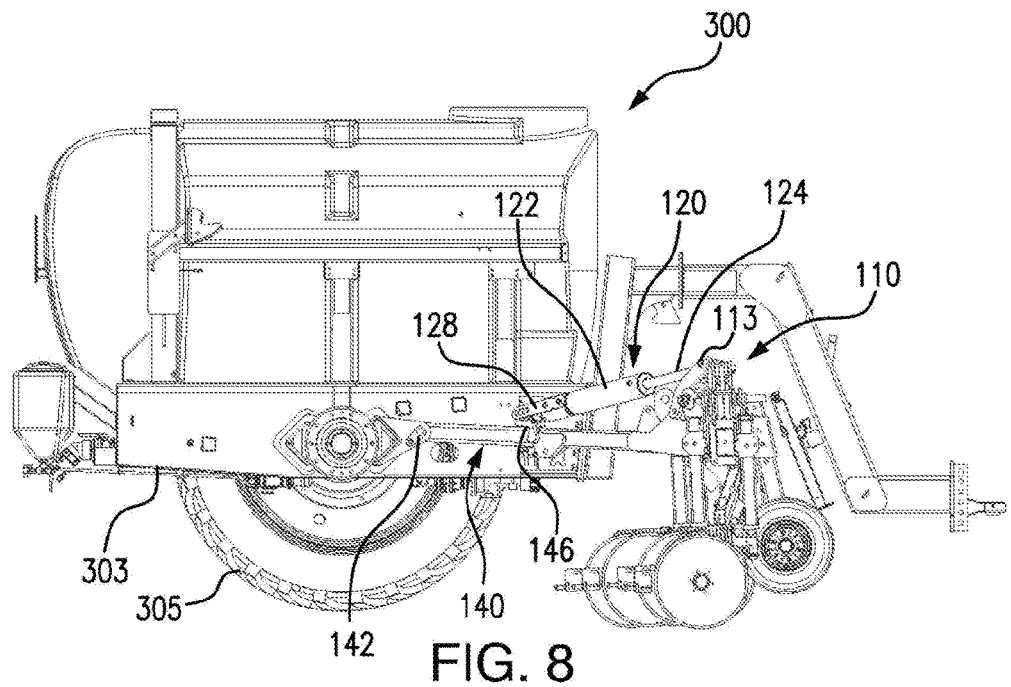
FIG. 8 is a side view of the implement with the wings of the toolbar system in the lowered operating position and with the right wheel omitted to reveal a main pivot point for the toolbar lift in accordance with an embodiment of the invention.
Figure 9:
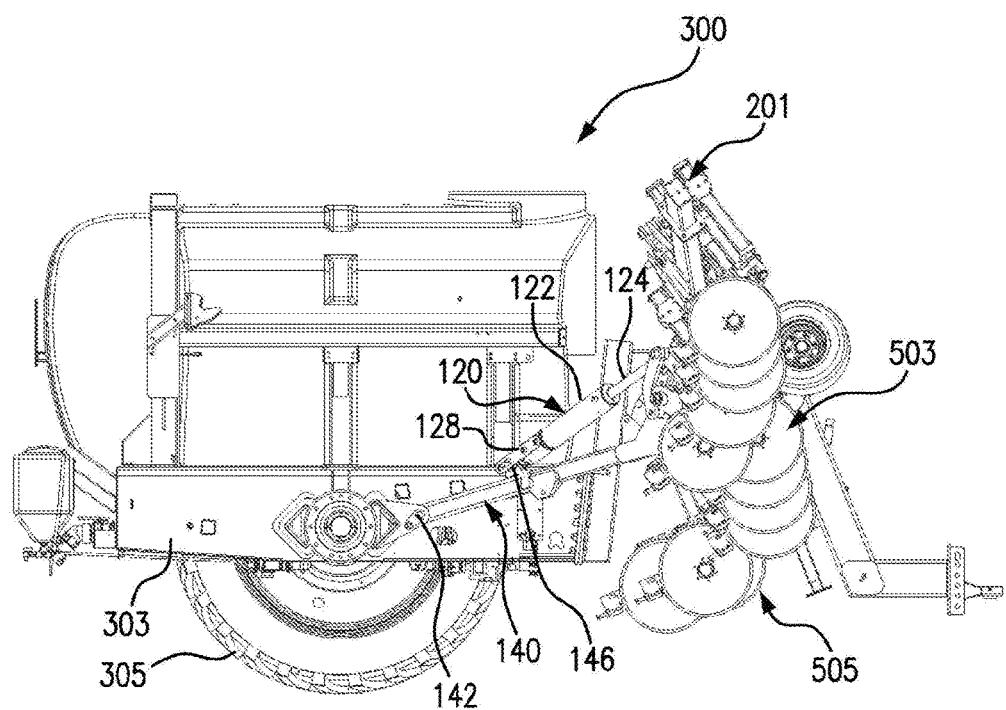
FIG. 9 is a side view of the implement with the wings of the toolbar system in the raised operating position and with the right wheel omitted to reveal the main pivot point for the toolbar lift in accordance with an embodiment of the invention.

FIG. 8 is a side view of the implement 300 with the wings in the lowered operating position and with one of the wheels 305 omitted to reveal components of the first wing pivot assembly 110. FIG. 9 is a side view of the implement 300 with the wings in the raised operating position and again with one of the wheels 305 omitted to reveal components of the first wing pivot assembly 110. As shown in FIGS. 8 and 9, a main pivot bar 140 extends from the frame 303 to the first wing pivot assembly 110 and specifically to the center wing 205. The main pivot bar 140 pivots about a point 142 anchored to the frame 303 as the wings 201, 203, 205 move between the lowered operating position shown in FIG. 8 and the raised operating position shown in FIG. 9.

The first wing pivot assembly 110 includes an actuator 120 coupled (e.g. pivotably coupled) at one end to an actuator anchor 146, positioned at a middle portion of the main pivot bar 140, and coupled (e.g. pivotably coupled) at an opposite end to a linkage assembly 113. Actuator 120 may comprise a linear actuator oriented so as to apply force in a direction that is generally perpendicular to the first pivot axis 114. Actuator 120 may comprise a hydraulic cylinder comprising a housing 122 with a first piston rod 124 and a second piston rod 126 not shown in FIGS. 8 and 9 and described in further detail below. In an embodiment, each cylinder rod of the actuator 120 can be actuated independently. As shown in FIGS. 8 and 9, the actuator 120 moves up and down with the main pivot bar 140. Due to the pivotal connection at each of its ends, the actuator 120 is also configured to rotate with respect to the main pivot bar 140 as either the first piston rod 124 or the second piston rod 126 starts to extend from or retract into the housing 122.

Figure 10:
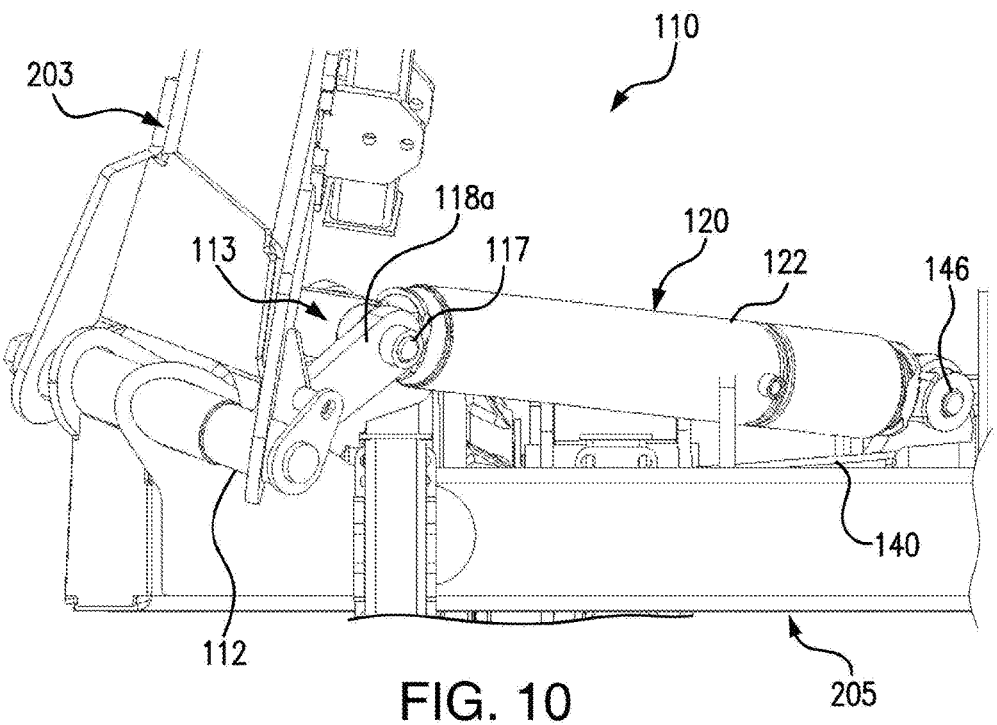
FIG. 10 is a partial front perspective view of a first wing pivot assembly with an inboard wing in a retracted (transport) position with respect to a center wing in accordance with an embodiment of the invention.
Figure 11:
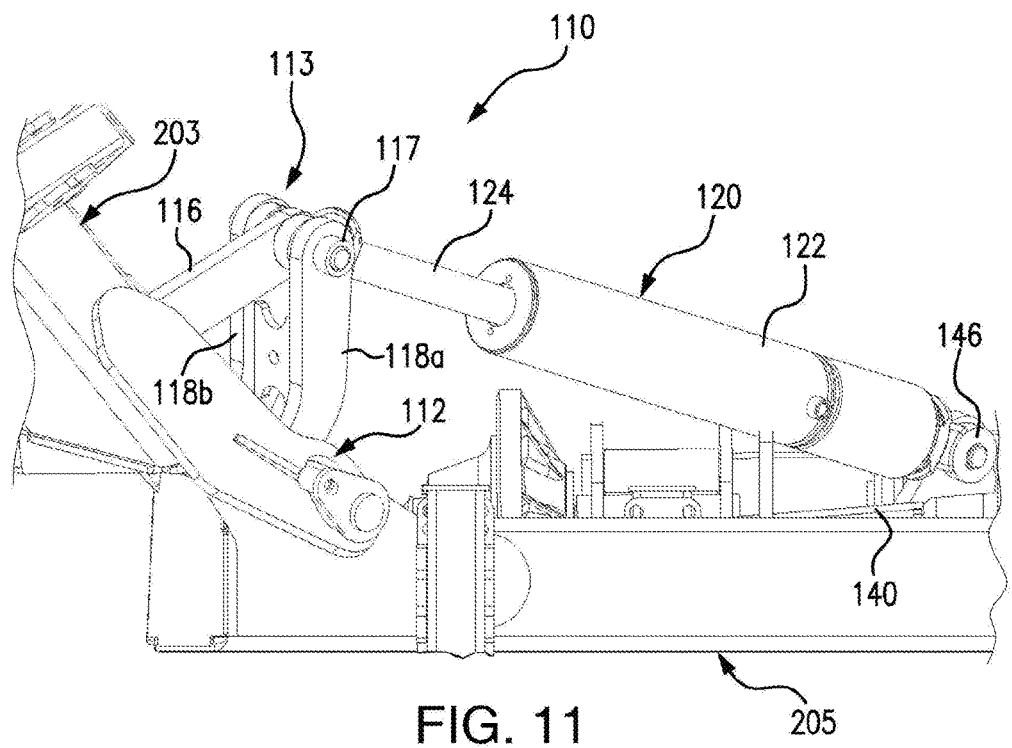
FIG. 11 is a partial front perspective view of the first wing pivot assembly with the inboard wing in an intermediate position with respect to the center wing in accordance with an embodiment of the invention.
Figure 12:
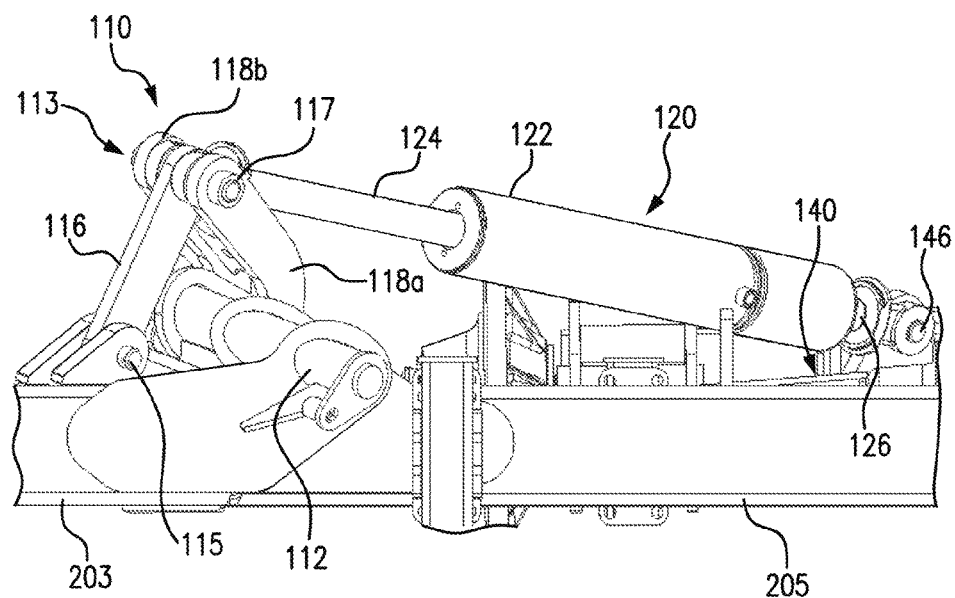
FIG. 12 is a partial front perspective view of the first wing pivot assembly with the inboard wing in an extended (operating) position with respect to the center wing in accordance with an embodiment of the invention.

FIGS. 10, 11, and 12 are partial front views of the first wing pivot assembly 110. In FIG. 10, the inboard wing 203 is in the retracted (transport) position with respect to the center wing 205. In FIG. 11, the inboard wing 203 is in an intermediate position with respect to the center wing 205. And in FIG. 12, the inboard wing 203 is in the extended position with respect to the center wing 205.

The linkage assembly 113 comprises a first linkage 116 pivotally connected at one end 115 (see FIGS. 12, 26A-26C) to the inboard wing 203 adjacent the skewed hinge 112. The linkage assembly 113 further includes two second linkages 118a, 118b pivotally mounted at their lower ends 119 (see FIGS. 13, 14, 26A-26C) to the center wing 205 adjacent the skewed hinge 112 and straddling the first linkage 116 where the second linkages 118a, 118b are connected to the first linkage 116 at a pivoting connection 117 (see FIGS. 10-12, 26A-26C).

The first rod 124 of the actuator 120 extending from one end of a housing 122 is connected to the linkage assembly 113 at the pivoting connection 117. A second rod 126 (see FIG. 12) extending from an opposite end of the housing 122 is connected (e.g. pivotally connected) to an actuator anchor 146 attached to the main pivot bar 140.

The first rod 124 of the actuator 120 is actuated during the folding operation which causes the inboard wing 203 to rotate around the first pivot hinge 112 from the raised operating position (FIG. 2) to the transport position (FIG. 5). The second rod 126 of actuator 120 is used to rotate the inboard wing 203 about pivot hinge 112 between the lowered operating position (FIG. 1) and the raised operation position (FIG. 2).

The process of rotating the inboard wing 203 about the pivot hinge 112 in respect to the center wing 205 can also be achieved by using an actuator with only 1 rod and the use of mechanical or hydraulic limiters to create the two ranges of travel.

The action of raising the toolbar 100 from the lowered operation position in FIG. 1 to the raised operating position in FIG. 2 does not require the rotation of the inboard wing 203 to be above parallel to axis A/B. The rotation of the inboard wing 203 above parallel to axis A/B increases the clearance between the inboard coulters 503 and the ground for crop clearance. If rotation of the inboard wing 203 for crop clearance in reference to axis A/B shown in FIG. 2 is not required, a single rod actuator can be used to rotate the inboard wing 203 about the pivot hinge 112 from the raised operating position to the transport position without the use of mechanical or hydraulic limiters.

As shown in FIG. 11, as the second rod 126 of the actuator 120 is retracted into the housing 122 and as the first rod 124 begins to retract into the housing 122, the action of the actuator 120 on the linkage assembly 113 begins to cause the inboard wing 203 to pivot about the skewed hinge 112 with respect to the center wing 205.

As shown in FIG. 10, when the first rod 124 is fully retracted into the housing 122, the action of the actuator 120 on the linkage assembly 113 causes the inboard wing 203 to fully pivot with respect to the center wing 205 about the skewed hinge 112 to its retracted (transport) position.

Thus, a single actuator—actuator 120—both pivots the inboard wing 203 upwardly and toward the centerline of the implement and swings the inboard wing 203 rearwardly to the transport position. The first pivot axis defined by the skewed hinge, being oriented at an acute angle with respect to the longitudinal axis $D_1$ (the longitudinal centerline of the implement 300) and the lateral axis A, allows the inboard wing to pivot from the operating position (e.g., FIG. 1) to the retracted (transport) position (e.g., FIG. 3) in one continuous motion. In the context of the present disclosure, one continuous motion means that each inboard wing 203 pivots about only a single pivot axis when moving from the operating position to the transport position. In other words, the first pivot axis 114 defined by the skewed hinge 112 is the only axis of rotation needed for the inboard wing 203 to pivot about during the folding operation. In prior art implements, at least two discrete movements over two discrete pivot axes are required to move the inboard wing from the operating position to the transport position: a first pivot to rotate the wing upwardly about a longitudinally-oriented pivot axis and a second pivot to rotate the wing about a vertically-oriented axis of rotation to the retracted position alongside a side of the implement.

Figure 15:
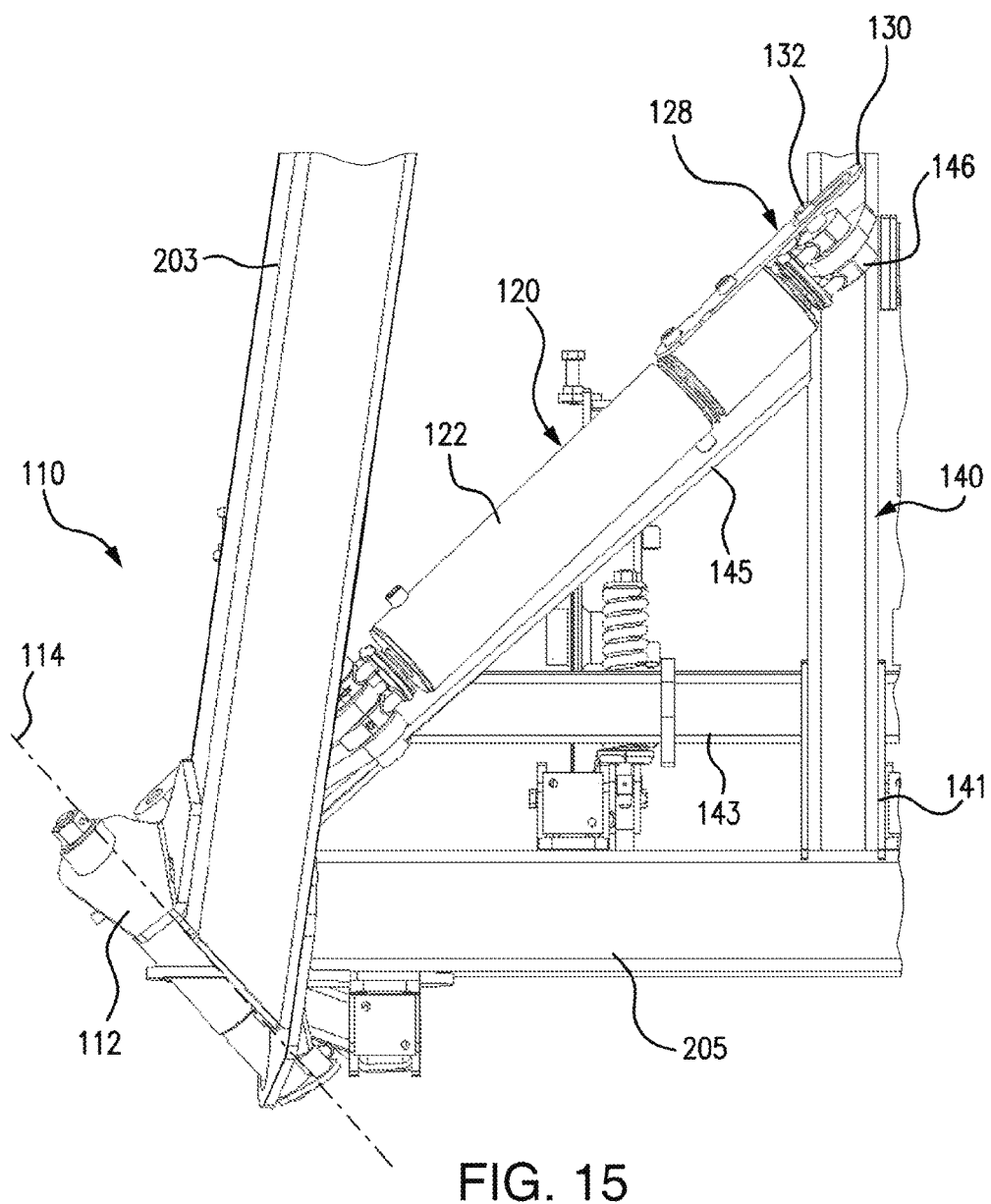
FIG. 15 is a partial top view of the first wing pivot assembly with the inboard wing in the retracted (transport) position with respect to the center wing in accordance with an embodiment of the invention.

FIGS. 13, 14, and 15 are partial top views of the first wing pivot assembly 110. In FIG. 13, the inboard wing 203 is in the extended position with respect to the center wing 205. In FIG. 14, the inboard wing 203 is in an intermediate position with respect to the center wing 205. And in FIG. 15, the inboard wing 203 is in the retracted (transport) position with respect to the center wing 205.

As shown in FIGS. 13, 14, and 15, a portion of the main pivot bar 140 attached to the center wing 205 comprises a triangular structure including a first strut 141, which is an extension of the main pivot bar 140, a second strut 145 extending diagonally from the first strut 141 to the center wing 205 adjacent the skewed hinge 112, and a third strut 143 extending between the first strut 141 and the second strut 145. Second strut 145 generally underlies the actuator 120 and is attached at one end thereof to the first strut 141 at the actuator anchor 146 and is attached at an opposite end to the center wing 205 below the linkage assembly 113 Like the actuator 120, the second strut 145 may be oriented in a direction that is generally perpendicular to the first pivot axis 114. The second strut 145 stabilizes the end of the center wing 205 so that the forces exerted by the actuator 120 onto the linkage assembly 113 and the center wing 205 does not cause appreciable deflection in the center wing 205. The third strut 143 extends between the first strut 141 and the second strut 145 to provide additional stability and rigidity to the structure.

As shown in FIG. 13, with the first rod 124 extended from the housing 122 and the second rod 126 extended from the housing 122 of the actuator 120, the inboard wing 203 is extended in its operating position relative to the center wing 205.

In FIG. 14, second rod 126 has been retracted into the housing 122 and the first rod 124 is beginning to retract, thereby acting on the linkage assembly 113 to pivot the inboard wing 203 about the skewed hinge 112 and the first pivot axis 114.

In FIG. 15, the first and second rods 124, 126 are fully retracted into the housing 122 of the actuator 120, and the inboard wing 203 is retracted into its transport position with respect to the center wing 205.

Figure 16:
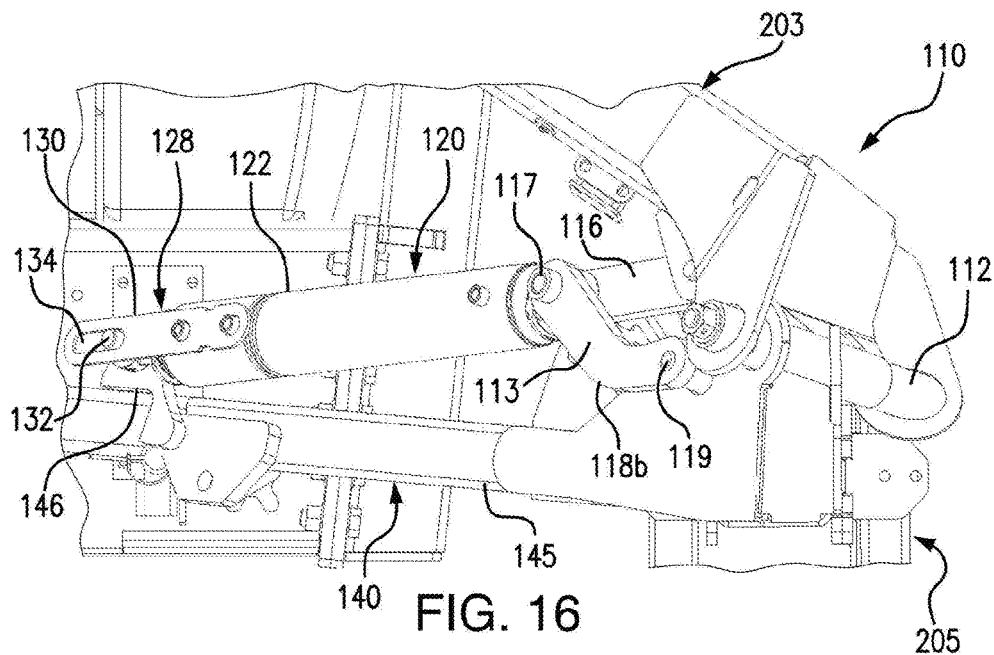
FIG. 16 is a partial side view of the first wing pivot assembly with the inboard wing in the retracted (transport) position with respect to the center wing in accordance with an embodiment of the invention.
Figure 17:
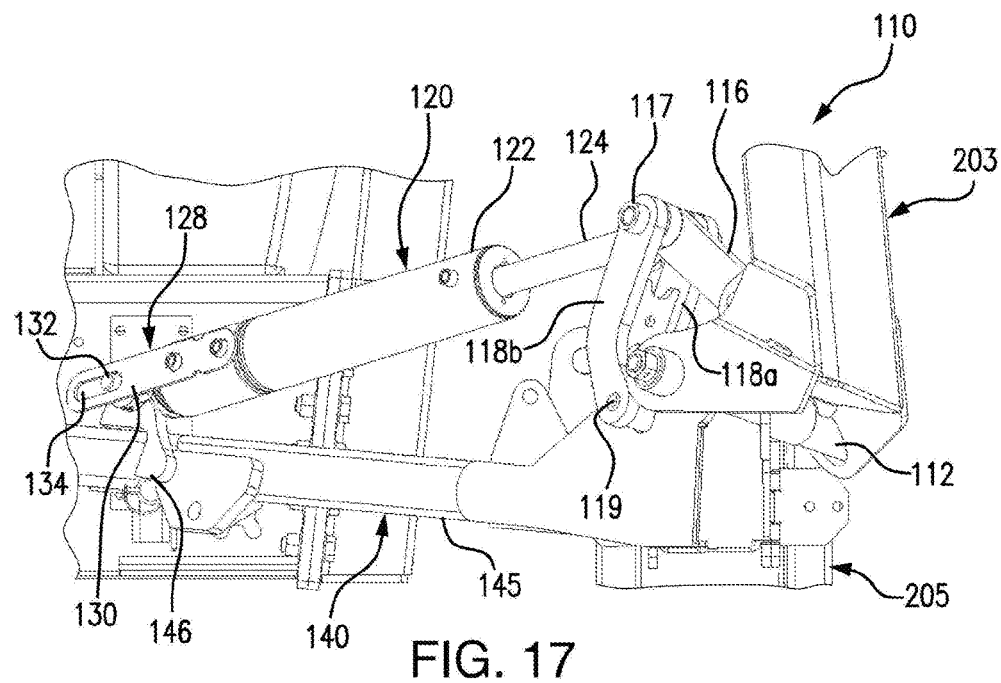
FIG. 17 is a partial side view of the first wing pivot assembly with the inboard wing in an intermediate position with respect to the center wing in accordance with an embodiment of the invention.

FIGS. 16 and 17 are partial side views of the first wing pivot assembly 110. In FIG. 16, the inboard wing 203 is in the retracted (transport) position with respect to the center wing 205. In FIG. 17, the inboard wing 203 is in an intermediate position with respect to the center wing 205.

In FIG. 16, the first and second rods are retracted into the housing 122 of the actuator 120, thereby acting on the linkage assembly 113 to pivot the inboard wing 203 about the skewed hinge 112 to the retracted (transport) position with respect to the center wing 205.

Figure 26C:
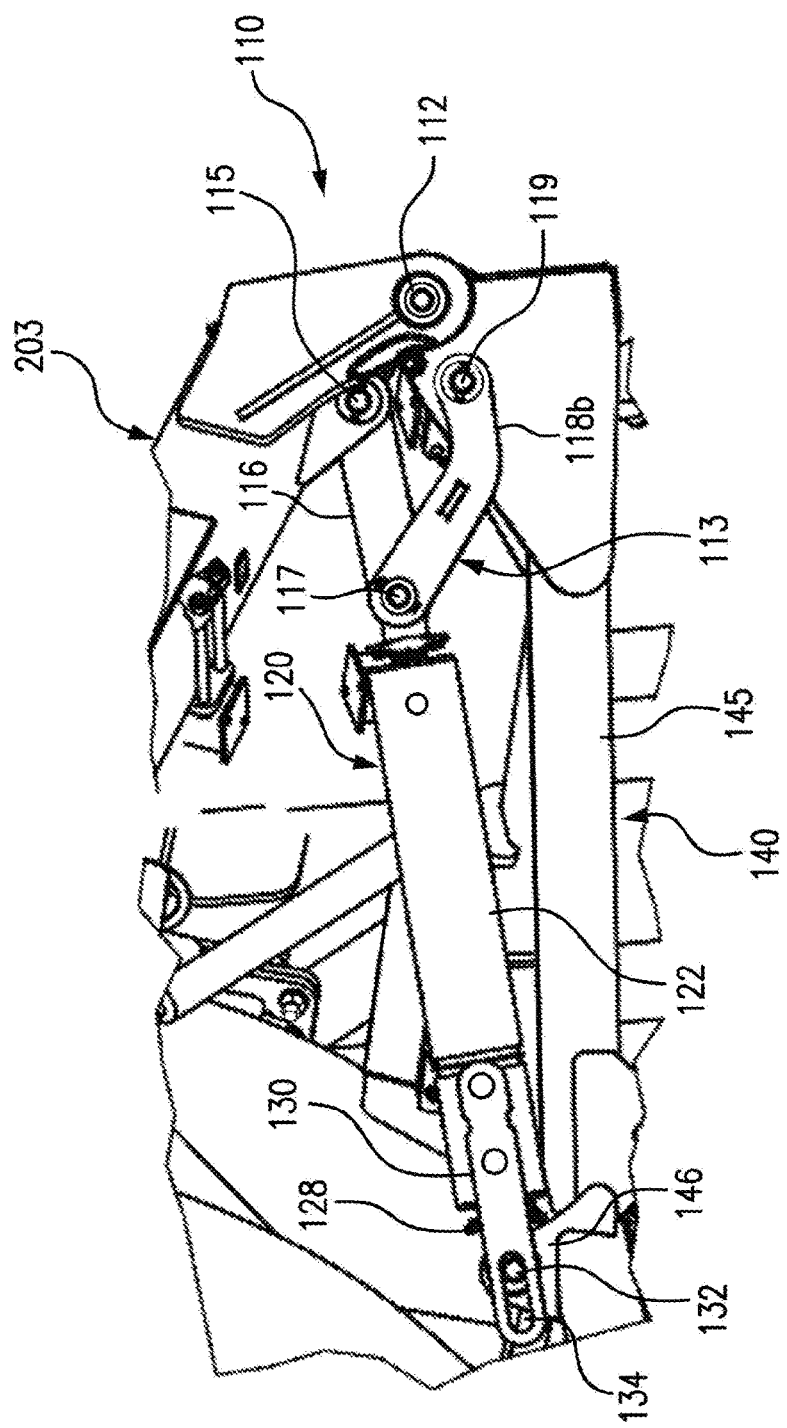
FIG. 26C is a partial view of the first wing pivot assembly in the plane perpendicular to the first pivot axis of the skewed hinge with the inboard wing in the transport position.

As further shown in FIGS. 16 and 17, an anti-rotation mechanism 128 may be provided on the actuator 120 (see also FIGS. 26A-C). In the illustrated embodiment, anti-rotation mechanism 128 includes an elongated plate 130 attached to the housing 122 and having a slot 134 extending in a longitudinal direction relative to the actuator 120. A pin 132 is fixed to prevent axial movement of the pin and extends into the slot 134. The anti-rotation mechanism 128 prevents rotation of the housing 122 on the actuator rods 124, 126 (e.g., to prevent twisting, kinking, or other problems with hydraulic hoses supplying pressure to the actuator 120).

FIG. 26A is a partial view of the first wing pivot assembly 110 in a plane perpendicular to the first pivot axis 114 of the skewed hinge 112 with the inboard wing 203 in the extended (operating) position, parallel to the center wing 205 (and lateral A/B). FIG. 26B is a partial view of the first wing pivot assembly 110 in the plane perpendicular to the first pivot axis 114 of the skewed hinge 112 with the inboard wing 201 in the raised operating position (as in FIG. 2) with respect to the center wing 205. FIG. 26C is a partial view of the first wing pivot assembly 110 in the plane perpendicular to the first pivot axis 114 of the skewed hinge 112 with the inboard wing 203 in the transport position (as in FIGS. 3-5).

In FIG. 26A, the first rod 124 of the actuator 120 is fully extended and the second rod 126 of the actuator 120 is partially extended from the housing 122, thereby acting on the linkage assembly 113 to extend the inboard wing 203 about the skewed hinge 112 to the lowered operating position parallel to the center wing 205 and to allow inboard wing 203 to pivot downwardly as described below.

In FIG. 26B, the first rod 124 of the actuator 120 is fully extended and second rod 126 of the actuator 120 is fully retracted into the housing 122, thereby acting on the linkage assembly 113 to pivot the inboard wing 203 about the skewed hinge 112 to the raised operating position with respect to the center wing 205.

In FIG. 26C, the first rod 124 is fully retracted and second rod 126 is fully retracted into the housing 122 of the actuator 120, thereby acting on the linkage assembly 113 to pivot the inboard wing 203 about the skewed hinge 112 to the retracted (transport) position with respect to the center wing 205.

In an embodiment, the full angular rotation of each inboard wing 203 with respect to the center wing 205 about the skewed hinge 112 in moving from the lowered operating position (FIG. 26A) to the transport position (FIG. 26C) is about 161°±5.0. In an embodiment in which the inboard wing 203 is configured to pivot downwardly with respect to the center wing 205 to accommodate ground contours (e.g., by about 10°), the total rotation of the inboard wing 203 with respect to the center wing 205 about the skewed hinge 112 is about 176°±5.0.

An advantage of the implement as described herein is that by lifting and folding the toolbar, the overall width of the implement may be reduced. Narrower road transport width may be beneficial to the operators by making it safer and more convenient to transport the implement on the roads. In addition, each third wing may be folded downwardly with respect to each second wing when the implement is set in the transport position, thereby reducing the overall height of the implement while being transported on the roads. Further, when the toolbar is in the shipping position, each third wing is folded downwardly with respect to each second wing, and the tools coupled to the wings are removed, rotated, or pushed down as described above, the height and width of the spray implement may be reduced, thereby reducing the overall shipping height and width of the implement. This makes it more practical to ship the implement in an assembled, or nearly-assembled, configuration, thereby avoiding or limiting assembly requirements on the receiving end as well as avoiding added shipping expenses associated with shipping permits and shipping escorts.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An agricultural implement comprising:
a frame having a longitudinal axis and laterally opposed sides;
motive supports mounted to and supporting the frame;
a first wing carried by the frame and at least one second wing, each second wing being pivotably connected to the first wing;
an elevator mechanism comprising a first actuator configured to raise and lower the first wing and the second wing; and
a wing pivot assembly comprising a skewed hinge pivotably connecting each second wing to the first wing, wherein the wing pivot assembly is configured to cause each second wing to pivot with respect to the first wing between an operating position extending from the frame in a lateral direction with respect to the longitudinal axis and a transport position alongside one of the opposed sides, and wherein the skewed hinge defines a first pivot axis oriented at an acute angle with respect to the longitudinal axis; and
a pivot bar pivotably connected at a first end to the frame and connected at a second end to the first wing.

2. The agricultural implement of claim 1, further comprising:
at least one third wing, each third wing being pivotably connected to one second wing; and
second wing pivot assembly pivotably connecting each third wing to one second wing and defining a second pivot axis that is transverse to a longitudinal axis of the second wing and configured to cause the each third wing to pivot with respect to the second wing.

3. The agricultural implement of claim 2, wherein each third wing is configured to pivot downward with respect to the second wing into a shipping or transport position.

4. The agricultural implement of claim 1, wherein the wing pivot assembly includes a linkage assembly and a second actuator pivotably coupled to the linkage assembly.

5. The agricultural implement of claim 2, further comprising tools operatively mounted on the first, second, and third wings.

6. The agricultural implement of claim 4, wherein the second actuator is mounted to the pivot bar.

7. The agricultural implement of claim 1, further comprising a tank supported on said frame.

8. The agricultural implement of claim 5, wherein the tools comprise coulters.

9. The agricultural implement of claim 1, wherein the wing pivot assembly is configured to permit the second wing to pivot with respect to the first wing by an angle of up to about 181°.

10. The agricultural implement of claim 1, wherein the angle of the first pivot axis with respect to the longitudinal axis is about 42.35°±15.0°.

11. The agricultural implement of claim 6, wherein the pivot bar includes an actuator anchor positioned along the pivot bar between the first end and second end, and the pivot bar includes a first strut extending between actuator anchor and the second end connected to the first wing and a second strut extending diagonally between the first strut at the actuator anchor and the first wing adjacent to the skewed hinge.

12. The agricultural implement of claim 11, wherein the second strut extends substantially perpendicular to the first pivot axis.

13. An agricultural implement comprising:
a frame having a longitudinal axis and laterally opposed sides;
motive supports mounted to and supporting the frame;
a first wing carried by the frame and at least one second wing, each second wing being pivotably connected to the first wing;
an elevator mechanism configured to raise and lower the first wing and the second wing;
a wing pivot assembly comprising a skewed hinge pivotably connecting each second wing to the first wing, wherein the wing pivot assembly is configured to cause each second wing to pivot with respect to the first wing between an operating position extending from the frame in a lateral direction with respect to the longitudinal axis and a transport position alongside one of the opposed sides, and wherein the skewed hinge defines a first pivot axis oriented at an acute angle with respect to the longitudinal axis; and
a pivot bar pivotably connected at a first end to the frame and connected at a second end to the first wing;
wherein the wing pivot assembly includes a linkage assembly and an actuator, and the actuator is pivotably connected at a first end to the linkage assembly and at a second end to an actuator anchor positioned along the pivot bar so that the actuator is oriented substantially perpendicular to the first pivot axis.

14. An agricultural implement comprising:
a frame having a longitudinal axis and laterally opposed sides;
motive supports mounted to and supporting the frame;
a first wing carried by the frame and at least one second wing, each second wing being pivotably connected to the first wing;
an elevator mechanism configured to raise and lower the first wing and the second wing; and
a wing pivot assembly comprising a skewed hinge pivotably connecting each second wing to the first wing, wherein the wing pivot assembly is configured to cause each second wing to pivot with respect to the first wing between an operating position extending from the frame in a lateral direction with respect to the longitudinal axis and a transport position alongside one of the opposed sides, and wherein the skewed hinge defines a first pivot axis oriented at an acute angle with respect to the longitudinal axis;
wherein the wing pivot assembly includes a linkage assembly and an actuator pivotably coupled to the linkage assembly;
wherein the linkage assembly includes a first linkage and a plurality of second linkages, and the first linkage is pivotably connected at a first end to the second wing adjacent to the skewed hinge, and each second linkage includes a lower end pivotably connected to the first wing adjacent the skewed hinge and an upper end pivotably connected to a second end of the first linkage to define a pivoting connection adjacent to the skewed hinge.

15. The agricultural implement of claim 14, wherein the actuator includes a housing and a first rod extending from a first end of the housing and pivotably connected to the linkage assembly at the pivoting connection.

16. The agricultural implement of claim 15, wherein the actuator includes a second rod extending from a second end of the housing and pivotably connected to a pivot bar, and the pivot bar is pivotably connected at a first end to the frame and connected at a second end to the first wing.

\* \* \* \* \*